(12) United States Patent
Carson et al.

(10) Patent No.: US 8,596,599 B1
(45) Date of Patent: Dec. 3, 2013

(54) APPARATUS FOR MOUNTING A PLURALITY OF MONITORS HAVING ADJUSTABLE DISTANCE TO A VIEWER

(75) Inventors: Barry Carson, Highlands Ranch, CO (US); David R. Carson, Larkspur, CO (US); Kenneth R. Carson, Centennial, CO (US)

(73) Assignee: Xybix Systems Incorporated, Littleton, CO (US)

( * ) Notice: Subject to any disclaimer, the term of this patent is extended or adjusted under 35 U.S.C. 154(b) by 321 days.

(21) Appl. No.: 13/018,308

(22) Filed: Jan. 31, 2011

Related U.S. Application Data

(63) Continuation-in-part of application No. 11/394,071, filed on Mar. 29, 2006, now Pat. No. 7,878,476.

(60) Provisional application No. 60/666,512, filed on Mar. 29, 2005.

(51) Int. Cl.
F16M 13/00 (2006.01)

(52) U.S. Cl.
USPC ........ 248/429; 248/298.1; 248/917; 248/919; 248/920; 248/921; 211/26

(58) Field of Classification Search
USPC .................. 248/917–923, 429, 298.1; 211/26
See application file for complete search history.

(56) References Cited

U.S. PATENT DOCUMENTS

| | | |
|---|---|---|
| 496,739 A | 5/1893 | Kennedy |
| 1,839,309 A | 1/1932 | Gundel |
| 2,065,952 A | 12/1936 | Trautmann |
| 3,896,744 A | 7/1975 | Goebl |
| 3,908,565 A | 9/1975 | Burnett |
| 4,046,419 A | 9/1977 | Schmitt |
| 4,062,156 A | 12/1977 | Roth |
| 4,456,212 A | 6/1984 | Raftery |
| 4,619,208 A | 10/1986 | Kurrasch |
| 4,651,652 A | 3/1987 | Wyckoff |
| 4,667,605 A | 5/1987 | Bastian |
| 4,711,184 A | 12/1987 | Wallin et al. |
| 4,714,025 A | 12/1987 | Wallin et al. |
| 4,747,353 A | 5/1988 | Watt |
| 4,793,197 A | 12/1988 | Petrovsky |
| 4,844,387 A | 7/1989 | Sorgi et al. |
| 4,920,458 A | 4/1990 | Jones |
| 5,022,327 A | 6/1991 | Solomon |
| 5,056,278 A | 10/1991 | Atsukawa |
| 5,088,421 A | 2/1992 | Beckstead |
| 5,098,160 A | 3/1992 | Moore et al. |
| 5,101,736 A | 4/1992 | Bommarito et al. |
| 5,174,223 A | 12/1992 | Nagy et al. |
| 5,224,429 A | 7/1993 | Borgman et al. |

(Continued)

OTHER PUBLICATIONS

Notice of Allowability for U.S. Appl. No. 11/394,071, mailed Aug. 30, 2010.

*Primary Examiner* — Amy J Sterling
(74) *Attorney, Agent, or Firm* — Sheridan Ross P.C.

(57) ABSTRACT

An apparatus and method for mounting a plurality of display monitors is disclosed, wherein the apparatus is provided at a user's desk or workstation. The apparatus can be easily moved toward and away from the user such that all the monitors mounted on the apparatus move in unison in the direction indicated by the user. Accordingly, the apparatus accommodates the visual preferences of virtually all users of the desk or workstation so that eye and skeletal muscle fatigue are reduced.

13 Claims, 22 Drawing Sheets

(56) References Cited

U.S. PATENT DOCUMENTS

| | | | |
|---|---|---|---|
| 5,234,187 A | 8/1993 | Teppo et al. | |
| 5,243,921 A | 9/1993 | Kruse et al. | |
| 5,259,326 A | 11/1993 | Borgman et al. | |
| 5,282,593 A | 2/1994 | Fast | |
| 5,285,733 A | 2/1994 | Waibel | |
| 5,289,782 A | 3/1994 | Rizzi et al. | |
| 5,319,248 A | 6/1994 | Endou | |
| 5,405,117 A | 4/1995 | Davis | |
| 5,450,800 A | 9/1995 | Leonard | |
| 5,475,624 A | 12/1995 | West | |
| 5,495,811 A | 3/1996 | Carson et al. | |
| 5,537,127 A | 7/1996 | Jingu | |
| 5,579,033 A | 11/1996 | Rutledge et al. | |
| 5,765,910 A | 6/1998 | Larkin et al. | |
| 5,810,301 A | 9/1998 | McGrath et al. | |
| 5,857,415 A | 1/1999 | Richard | |
| 5,930,152 A | 7/1999 | Dumont et al. | |
| 6,194,853 B1 | 2/2001 | Tual et al. | |
| 6,237,997 B1 | 5/2001 | Olson | |
| 6,264,146 B1 | 7/2001 | Hill et al. | |
| 6,343,006 B1 | 1/2002 | Moscovitch et al. | |
| 6,422,399 B1 | 7/2002 | Castillo et al. | |
| 6,505,780 B1 | 1/2003 | Yassin et al. | |
| 6,644,745 B2 | 11/2003 | Rogers et al. | |
| 6,665,600 B2 | 12/2003 | Miller et al. | |
| 6,675,082 B2 | 1/2004 | Galli et al. | |
| 6,685,033 B1 | 2/2004 | Baddour et al. | |
| 6,741,920 B1 | 5/2004 | Otto | |
| 6,748,797 B2 | 6/2004 | Breed et al. | |
| 6,814,410 B2 | 11/2004 | Piaulet et al. | |
| 6,827,409 B2 | 12/2004 | Michael | |
| 6,831,993 B2 | 12/2004 | Lemelson et al. | |
| 6,851,851 B2 | 2/2005 | Smith et al. | |
| 6,923,502 B2 | 8/2005 | Cassaday | |
| 6,956,735 B2 | 10/2005 | Lee et al. | |
| 6,964,370 B1 | 11/2005 | Hagale et al. | |
| 7,066,544 B2 | 6/2006 | Tseng | |
| 7,100,052 B2 | 8/2006 | Ghazarian | |
| 7,136,280 B2 | 11/2006 | Jobs et al. | |
| 7,198,241 B1 | 4/2007 | Helgenberg et al. | |
| 7,316,378 B1 | 1/2008 | Curran et al. | |
| 7,677,182 B2 | 3/2010 | Mueller et al. | |
| 7,735,162 B2 | 6/2010 | Ringholz | |
| 7,878,476 B2 | 2/2011 | Carson et al. | |
| 7,997,550 B2 * | 8/2011 | Kuhn | 248/276.1 |
| 2002/0020329 A1 | 2/2002 | Kowalski | |
| 2004/0010328 A1 | 1/2004 | Carson et al. | |
| 2004/0195471 A1 | 10/2004 | Sachen | |
| 2004/0203379 A1 | 10/2004 | Witkowski et al. | |
| 2004/0211343 A1 | 10/2004 | Song | |
| 2005/0017842 A1 | 1/2005 | Dematteo | |
| 2005/0268826 A1 | 12/2005 | Ferreira | |
| 2010/0198374 A1 | 8/2010 | Carson et al. | |

* cited by examiner

APPARATUS FOR MOUNTING A PLURALITY OF MONITORS HAVING ADJUSTABLE DISTANCE TO A VIEWER

RELATED APPLICATION

The present application is a continuation-in-part of U.S. patent application Ser. No. 11/394,071, filed Mar. 29, 2006, which claims the benefit of U.S. Provisional Patent Application Ser. No. 60/666,512, filed Mar. 29, 2005. The entire disclosures of the prior applications hereinabove are incorporated herein fully by reference.

FIELD OF THE INVENTION

The present invention is directed toward a method of providing a mechanism to the computer user for the effortless manual or automated adjustment of LCD computer monitors to enable proper focal lengths and view angles for individual or multiple users at a single workstation.

BACKGROUND OF THE INVENTION

Individual computer users typically have differing visual and physical requirements for optimal viewing of computer screens. Inappropriate focal lengths or distance from the eye to the computer screen can cause visual fatigue, headaches or other symptoms of eye strain. Improper monitor heights can result in muscular strain and fatigue as well. An ability to quickly and effortlessly achieve proper adjustment of monitors has the potential to reduce eye strain and muscular fatigue resulting in higher productivity and reduced worker's compensation claims as well as lowered levels of absenteeism related to these physical problems associated with intensive computer usage.

Attempts have been made to alleviate these problems using "monitor arms"—an articulating segmented arm which has a joint between two or more sections allowing the arm to be moved forward and back directly in line with the user's line of sight. A ball mount is typically attached to the end of the outermost arm which allows the attached monitor to be adjusted for pan and tilt. Such "monitor arms" typically require a friction type adjustment mechanism at each joint to prevent unwanted movement and a rigid mounting method which will prevent tipping forward due to the weight of the arm and attached monitor. Some versions of monitor arms include an up/down feature to adjust for proper view angles and these must be "balanced" to the weight of the attached monitor.

The above noted attempts to solve the problems of eye strain and related musculoskeletal injuries are offset by the difficulty of making proper and periodic adjustments to maintain the friction connections at the joints. The nature of the articulated arm design prevents the free and easy movement forward and back needed to make proper focal length adjustments. Adjustment requires the user to "fight" the tendency of the monitor arm to move sideways rather than directly forward or back. Arms with height adjustment require precise balancing to match the weight of the attached monitor. The tendency of most users, if adjustment is difficult, is to do nothing which negates the value of the investment in monitor arms and puts users at a higher risk of visual and musculoskeletal problems.

The increasing prevalence of multiple monitor workstations used by a plurality of different users simply multiplies the degree of difficulty involved in making the proper adjustments and lessens the likelihood of consistent compliance with health, safety and ergonomic adjustment guidelines promulgated by the Occupational Health and Safety Administration (OSHA), the American National Standards Institute (ANSI)/Human Factors and Ergonomics Society (HFES) in the United States and the International Organization for Standardization (ISO) in Europe and other countries of the world. Moreover, providing multiple monitors on articulated arms can be even more difficult for users to appropriately position due to size and weight of the resulting configuration. Additionally, configuring such a multiple monitor articulated arm so that adequate range of arm movement is provided requires supporting/mounting the arm on a wall, floor, or a rigid work surface due to the substantial torque resulting from extending the arm.

Accordingly, it is desirable to have a multiple monitor support apparatus that can be provided at a user's desk or workstation, wherein the apparatus can slidably glide over the desktop of the desk or workstation in manner that: (a) addresses the above-identified health, safety and ergonomic adjustment guidelines, (b) does so with reduced adjustments by the user(s), and (c) does so with substantially no torque that articulated arms generate when extended. These apparatus described hereinbelow provides these benefits as well as others.

SUMMARY OF THE INVENTION

A monitor mounting system (and method therefor) is disclosed for mounting a plurality of computer monitors (e.g., flat panel or LCD monitors) so that a user can easily view each of the plurality of monitors from substantially a single sitting or standing position. In particular, the monitor mounting system attaches to a desk or workstation so that the entire monitor mounting system can be easily moved toward or away from a user working (either sitting or standing) at the desk or workstation.

The monitor mounting system includes a monitor rack for mounting thereon, e.g., up to 10 or more large monitors. The monitor rack or frame is secured to a platform which is supported on an upwardly facing surface (e.g., a work surface or desktop) of the desk or workstation in a manner that allows the platform and the monitor rack to be easily moved toward or away from a designated work position at the desk or workstation. Embodiments of the monitor mounting system may include rollers, ball bearing wheels, bands, tracks or belts (all such items referred to as "rollers" herein) for movably supporting the platform (and the mounting rack) on the user's desktop. Thus, the rollers roll or glide on the desktop, preferably without a track or channel being embedded in the desktop for defining a path for any of the rollers.

To constrain or restrict the movement of the monitor mounting system to a predetermined path and range across the desktop, alignment guides are provided, wherein these guides also secure the monitor mounting system to the desk or workstation. Each alignment guide may include telescoping or retractable/extendable portions, wherein a first of these portions is secured to the desk or workstation, and a second portion is secured to the platform. In some embodiments, such alignment guides are positioned between the desktop and the platform.

Embodiments of the monitor mounting system can provide vertical adjustments for the mounted monitors. In one embodiment, a monitor can be slidably secured to substantially any position along a vertical length of a mounting rail of the rack. In particular, each monitor of a horizontal row of mounted monitors may be individually vertically positioned so that, e.g., monitors with different sized or shaped displays can have their corresponding display center points are substantially horizontally aligned (e.g., within ¼ inch vertically of one another). Additionally or alternatively, an entire horizontal row of mounted monitors may be vertically adjusted.

Embodiments of the monitor mounting system can be easily retro-fitted onto an existing desk or workstation by fastening the alignment guides to the desk or workstation.

Embodiments of the monitor mounting system may also include one or more hand grips provided in one or more locations on the platform and/or rack for assisting a user in adjusting the position of the monitor mounting system (i.e., adjusting the position of the rack and its mounted monitors relative to the user's predetermined user work space adjacent to the desk or workstation).

Embodiments of the monitor mounting system also can be motorized so that the position of at least the platform and the rack (together with its mounted monitors) can be adjusted using a motor rather than by a user pushing or pulling on the monitor mounting system. Such motorized embodiments may include sensors that can detect resistance to movement on the monitor mounting system as a user safety precaution.

Embodiments of the monitor mounting system are particularly useful where the monitors are mounted along an arc in front of the user so that the user's eyes are substantially at the center of the circle corresponding to this arc. In some embodiments, the distance between the user's eyes and the center of each monitor display (or at least ⅔ of the monitors) varies by, e.g., no more than about 5% when the user is positioned appropriately at the desk or workstation (e.g., when the user is in a predetermined position relative to the monitor mounting system). Accordingly, such embodiments of the monitor mounting system can be used to meet the guidelines established by the American National Standards Institute (ANSI) and the Human Factors and Ergonomics Society (HFES) for providing an ergonomic worksite where muscle strain, eye strain, and general user fatigue can be reduced. In satisfying such guidelines, embodiments of the monitor mounting system provide the capabilities to be adjusted:

(a) to a user desired distance from the user's eyes;
(b) so that the view angle from the user's horizontal eye level to the center of each monitor screen can be between 15° and 20° below this horizontal eye level; and
(c) so that the screen of each mounted monitor is substantially perpendicular to the user's line of sight (e.g., no greater deviation from the perpendicular than 5 degrees in any direction) when the user looks in the direction of the screen from a predetermined user work space adjacent to the desk or workstation.

Embodiments of the monitor mounting system can be characterized as follows:

(A.1) A computer monitor mounting apparatus for mounting a plurality of monitors, comprising:
a platform having at least one guide attached thereto, wherein the guide also contacts an upwardly facing surface so that the guide maintains the platform on a predetermined path on the upwardly facing surface when the platform moves on the upwardly facing surface; and
a frame extending above the platform, the frame providing mountings for suspending a plurality of the computer monitors above the platform;
wherein the guide includes parts that move relative to one another within a space between the upwardly facing surface and the platform.

(A.2) The computer monitor mounting system of (A.1), wherein the guide includes a portion that is fixedly attached to the upwardly facing portion.

(A.3) The computer monitor mounting system of (A.1), wherein the guide is attached to the surface wherein at least one guide telescopes during movement of the monitor mounting apparatus over the upwardly facing surface.

(A.4) The computer monitor mounting system of (A.1), wherein at least one guide retracts and extends during movement of the monitor mounting apparatus over the upwardly facing surface.

(A.5) The computer monitor mounting system of (A.1), wherein the platform has a range of movement along the predetermined path of at least 13 inches.

(A.6) The computer monitor mounting system of (A.1), wherein the platform has a range of movement along the predetermined path of less than 20 inches.

(A.7) The computer monitor mounting system of (A.1), wherein the platform includes wheels at least partially recessed within the platform.

(A.8) The computer monitor mounting system of (A.1), wherein the platform is supported on the surface.

(A.9) The computer monitor mounting system of (A.1), wherein the surface includes a substantially horizontal desktop.

(A.10) The computer monitor mounting system of (A.1), further including rollers for rolling the platform on the surface.

(A.11) The computer monitor mounting system of (A.10), wherein the rollers move over the surface without traveling within track or channel for at least a portion of a travel extent for the rollers.

(A.12) The computer monitor mounting system of (A.1), wherein at least two of the monitors have different size displays, and each of the at least two monitors is vertically positioned on the monitor mounting apparatus so that their corresponding display center points are substantially horizontally aligned with one another.

(A.13) The computer monitor mounting system of (A.1), wherein the frame includes a plurality of vertical posts extending from the platform, wherein the posts convey the weight of the monitors to the platform.

(A.14) The computer monitor mounting system of (A.13), wherein the frame includes one horizontal rail attached to the posts, wherein at least one of the monitors is supported on the rail.

(A.15) The computer monitor mounting system of (A.14), wherein the rail is vertically adjustable on the posts.

(A.16) The computer monitor mounting system of (A.14), wherein for each of the monitor displays on the rail, a variation in distances between: (a) a center point of the monitor display, and (b) a user's eyes, when the user is in a position relative to the monitor mounting system, is at most 1½ inches.

(A.17) The computer monitor mounting system of (A.16), wherein the variation is at most ¾ inches.

(A.18) The computer monitor mounting system of (A.14), wherein there are at least two rails attached to the posts, wherein each of the rails provides support for a different one of the monitors.

(A.19) The computer monitor mounting system of (A.18), wherein a maximum variation between: (a) a user's eyes in a particular position relative to the monitor mounting system, and a first monitor display on a first of the rails, and (b) the user's eyes in the particular position, and a second monitor display on a second of the rails is less than 2 inches.

(A.20) The computer monitor mounting system of (A.14), wherein the rail extends through an arc in a range of 60 degrees to 110 degrees relative to a user's eyes in a particular position relative to the monitor mounting system.

(A.21) The computer monitor mounting system of (A.1), further including one or more hand grips for use in moving the platform on the surface.

(A.22) The computer monitor mounting system of (A.1), wherein a distance between a user's eyes, when the user is in a particular position relative to the monitor mounting system, and a center of each display of at least two thirds of the monitors varies by no more than about 5%.

(A.23) The computer monitor mounting system of (A.1), wherein the monitors are adjustable on the monitor mounting apparatus so that a view angle from a user's horizontal eye level to the center of each monitor screen is between 15° and 20° below the horizontal eye level when the user is in a predetermined position relative to the monitor mounting system.

(A.24) The computer monitor mounting system of (A.1), wherein the monitors are adjustable on the monitor mounting apparatus so that each monitor display has no greater a deviation between a normal to the display and a user's line of sight than 5 degrees when the user is in a particular position relative to the monitor mounting system.

(B.1) A computer monitor mounting apparatus for mounting a plurality of monitors, comprising:
a platform having at least one guide attached thereto, wherein the guide also contacts a substantially horizontal upwardly facing surface so that the guide maintains the platform on a predetermined path on the upwardly facing surface when the platform moves across the upwardly facing surface, wherein the guide telescopes in a direction of the path; and
a frame extending above the platform, the frame including at least one rail for suspending a plurality of the computer monitors above the platform.

(B.2) The computer monitor mounting system of (B.1), wherein for each of at least some of the monitors, a corresponding mounting attaches the monitor to the rail wherein the mounting provides a horizontal range of rotation of at least 120 degrees for the monitor.

(B.3) The computer monitor mounting system of (B.1), wherein the frame includes two rails vertically spaced apart above the platform.

(B.4) The computer monitor mounting system of (B.1), wherein the monitors move in unison with a movement of the platform along the predetermined path.

(C.1) A method for mounting a plurality of monitors, comprising:
providing a platform having at least one guide attached thereto, wherein the guide also contacts a substantially horizontal upwardly facing surface so that the guide maintains the platform on a predetermined path on the upwardly facing surface, wherein the guide telescopes in a direction of the path;
providing a frame extending above the platform, the frame including one or more rails for suspending a plurality of the monitors above the platform; and
providing adjustable mounts for attaching the monitors to the one or more rails, wherein at least some of the mounts includes a ball and corresponding socket for adjusting an orientation of a corresponding monitor mounted on one of the rails by the ball and corresponding socket;
adjusting at least one of: (i) a distance of the platform from a user in a predetermined position relative to the upwardly facing surface, (ii) a vertical height of the at least one rail, and (iii) an orientation of a display of at least one of the monitors by moving the ball within the corresponding socket so that a display of the at least monitor is in a preferred user viewing orientation.

(D.1) A computer monitor mounting apparatus for mounting a plurality of monitors, comprising:
a platform having at least one guide attached thereto, wherein the guide also contacts an upwardly facing surface so that the guide maintains the platform on a predetermined path on the upwardly facing surface when the platform moves on the upwardly facing surface; and
a frame extending above the platform, the frame providing mountings for suspending a plurality of the computer monitors above the platform upon a substantially horizontal rail;
wherein at least one of the mountings includes a member for vertically adjusting a height of a monitor supported on the rail via at least one of the mountings, wherein the member includes a plurality of vertical adjustment positions.

Further description of advantages, benefits and patentable aspects of the present disclosure will become evident from the accompanying drawings and description hereinbelow. All novel aspects of the disclosure, whether mentioned explicitly in this Summary section or not, are considered subject matter for patent protection either singly or in combination with other aspects of this disclosure. Accordingly, such novel aspects disclosed hereinbelow and/or in the drawings that may be omitted from, or less than fully described in, this Summary section are fully incorporated herein by reference into this Summary. In particular, all (any) claims of the Claims section hereinbelow are fully incorporated herein by reference into this Summary section.

DETAILED DESCRIPTION OF THE INVENTION

Figure 1:
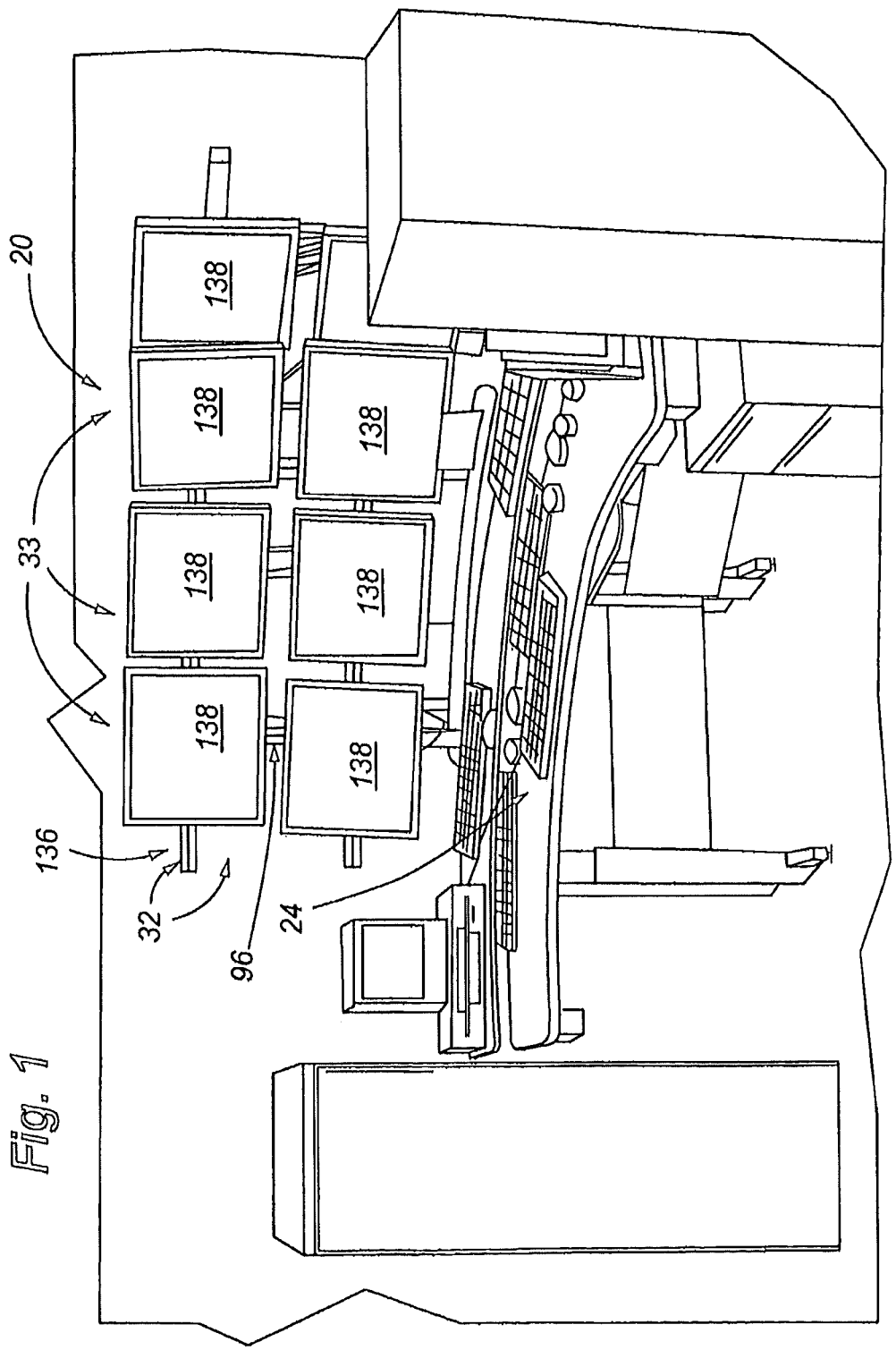
FIG. 1 shows an operable embodiment of the monitor mounting system 20.
Figure 2:
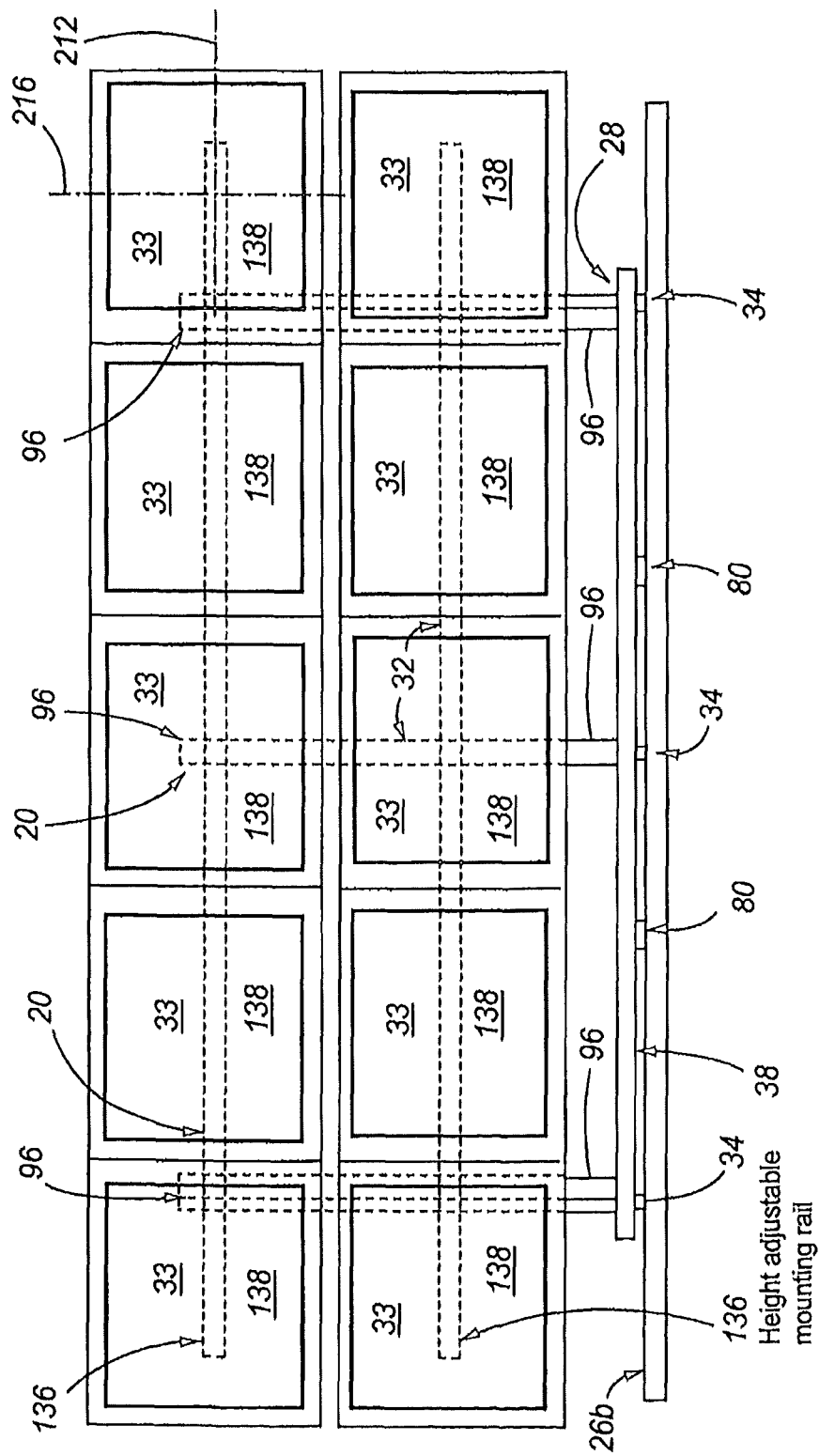
FIG. 2 shows a front view of the monitor mounting system 20.
Figure 3:
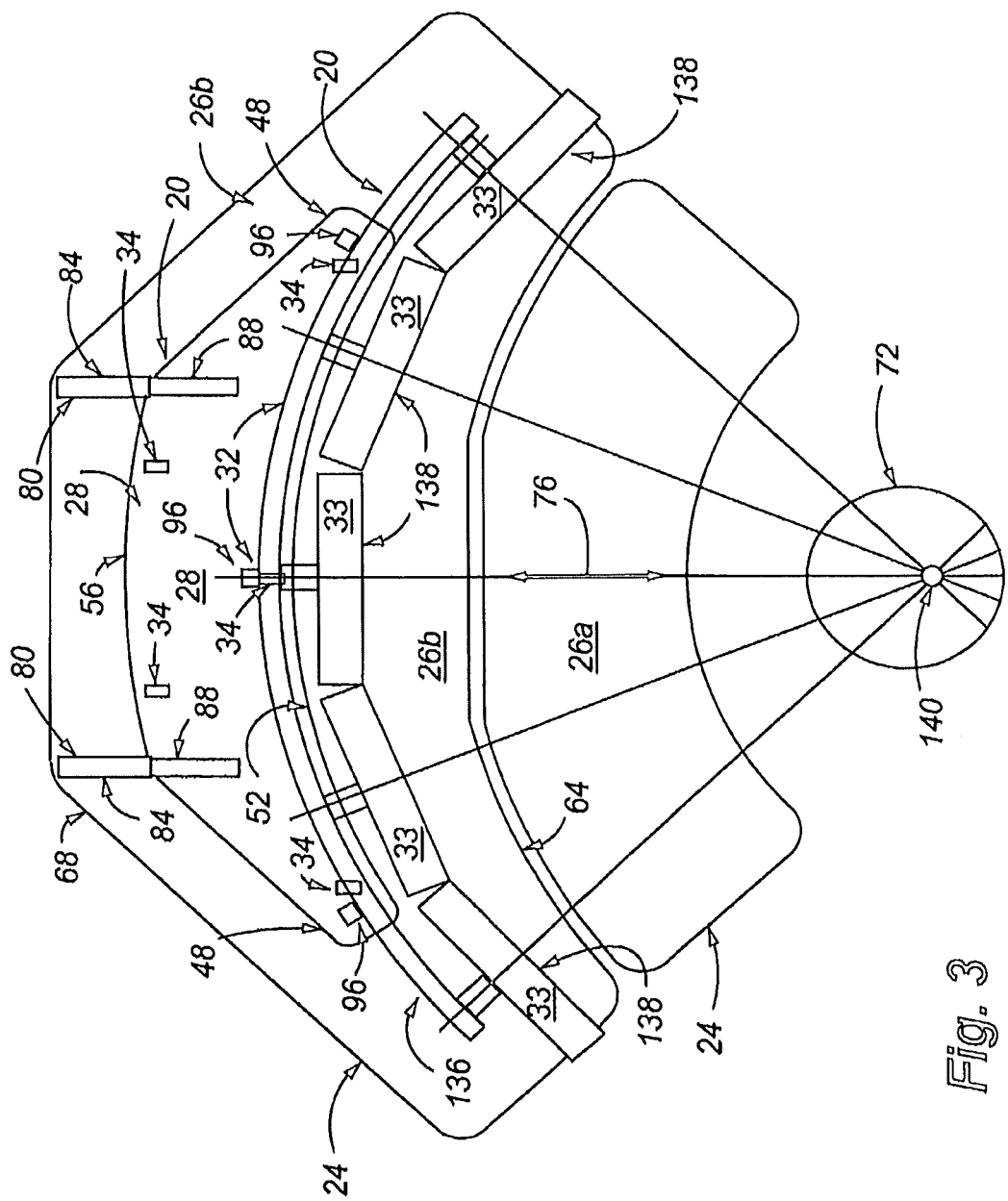
FIG. 3 shows an overhead view of the monitor mounting system 20.
Figure 4:
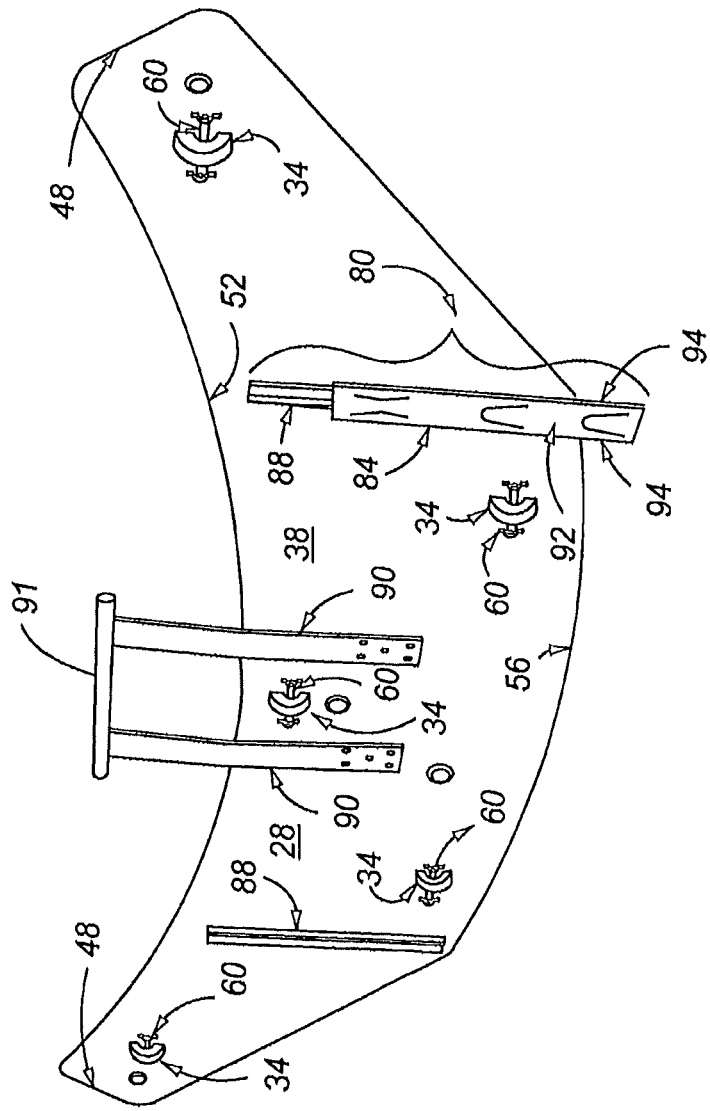
FIG. 4 shows an embodiment of the underside of the platform 28.

FIGS. 1-3 show different perspectives of an embodiment of the monitor mounting system 20. In particular, FIGS. 1-3 show the monitor mounting system 20 installed at a workstation 24 having a curved desktop that is split into forward desktop or work surface 26a (FIG. 3) and a rear desktop or work surface 26b. The monitor mounting system 20 includes a platform 28 upon which a monitor mounting rack (or merely rack herein) 32 is mounted, and which, in turn, has monitors 33 mounted thereon (each monitor having a display screen 138). The platform 28 has rollers 34 attached to (and partially embedded in) the side 38 (denoted "lower side" herein) of the platform wherein this side faces the rear desktop 26b upon which the monitor mounting system 20 is supported. In the present embodiment, there are five rollers 34 (FIGS. 3 and 4) distributed about the lower side 38. Any convenient number of rollers 34 and distribution pattern may be used to support the platform 28 as long as the platform rolls on the desktop 26b without the lower side 38 contacting the desktop 26b. Accordingly, in some embodiments of the monitor mounting system 20, only three rollers 34 may be used, and in other embodiments seven or more rollers may be used. However, to ensure the monitor mounting system 20 does not tip or become unstable, the rollers 34 are preferably provided adjacent to each of the lateral ends 48 of the platform 28, at least one roller adjacent the front edge 52 of the platform (between the rollers adjacent the lateral ends), and at least one roller adjacent the rear edge 56 of the platform (between the rollers adjacent the lateral ends). The rollers 34 may be ball bearing wheels (as shown in FIG. 4), although cylindrical wheels or track belts may also be used. The rollers 34 should be made from a material that will not mar or scratch the desktop 26b. Accordingly, a hard rubber or other elastomeric that is substantially non-deformable when subjected to, e.g., a weight of 30 to 100 pounds per roller. FIG. 4 shows each of the rollers 34 partially embedded in the lower side 38, wherein for each roller there is a corresponding axle 60 attached to the lower side 38 upon which the roller rolls. Note that the axles 60 and their rollers 34 are directionally aligned so that the platform 28 is substantially only movable in a straight line across the desktop 26b from the front desk edge 64 (FIG. 3) to back desk edge 68, and preferably such a line (e.g., through the center most roller 34) bisects the front of a workstation 24 user when the user is properly positioned facing the workstation. Space 72 (FIG. 3) shows where a properly positioned user would be for the workstation 24, and direction arrow 76 shows the movement of least resistance of the platform 28 according to the alignment of the rollers 34 on their axles.

The monitor mounting system 20 includes alignment guides 80 (FIGS. 2 and 3) both for attaching the monitor mounting system to the workstation 24, and for ensuring that the platform 28 moves substantially in the direction of arrow 76. In one preferred embodiment, such an alignment guide 80 includes at least one part that moves relative to one another in a space between the desktop 26b and lower side 38 of the platform 28, such parts being, e.g., telescoping members, bearings moving within a track, a wheel moving relative to a housing or belt, etc. Referring to the embodiment of the alignment guides in FIG. 4, each alignment guide 80 has a railing housing 84 (FIGS. 3 and 4) that attaches to the workstation 24, and a railing 88 that attaches to the lower side 38 of the platform 28. For each alignment guide 80, its railing housing 84 and railing 88 join together in a slidable and/or telescoping manner (e.g., via bearings, or wheels therebetween) so that the railing 88 slidably extends from and retracts into the railing housing 84 in the direction of arrow 76 for varying the distance to a workstation 24 user by approximately 13 inches in one embodiment. However, a range for such variability in movement of the platform 28 may be from a minimum of 13 inches to a maximum of 20 inches. In one embodiment of the alignment guides 80, bearings are provided within each railing housing 84, these bearing providing the surfaces within the railing housing upon which its railing 88 slides. Such alignment guides 80 may be similar to conventional hardware for drawer guides. Note that since the rollers 34 bear the weight of the monitor mounting system 20, the alignment guides do not have to withstand relatively high torques when the monitor mounting system 20 is extended toward a workstation 24 user. Accordingly, relatively inexpensive sliding mechanisms that can be used, wherein such mechanisms have a height of less than one inch (preferably in some embodiments, no greater than ¾ of an inch), and can sustain loads of 50 to 200 pounds depending on the direction of the load. However in at least some embodiments, it should noted that the sliding mechanisms do not support the weight of the monitor mounting system 20, but it is within the scope of the present invention to have such sliding mechanisms support the weight of the monitor mounting system 20. However, in each embodiment, the desktop or work surface (more generally upwardly facing surface) 26b is sufficiently level so that the frictional forces between: (a) the work surface 26b, and (b) the rollers and the guides is such that the monitor mounting system 20 does not move of its own accord on the work surface 26b.

Additionally, it is worth noting that the low height profile of at least some embodiments of the alignment guides 80 together with the low height profile of the rollers 34 (e.g., due to such rollers being partially embedded in the platform 28) allows the platform to be in a height range of approximately ¾ to 1½ inches from the desktop 26b surface. Such a range is advantageous in comparison to providing the platform 28 higher above the desktop 26b since positioning the monitors 33 higher than the advantageous range may make it difficult to provide the monitor displays 138 at a desired or preferred viewing orientation such as 15 to 20 degrees below the horizontal eye level of a user viewing such displays. Moreover, in some embodiments of the monitor mounting system 20, the vertical height of the alignment guides 80 may be less than ¾ of an inch (e.g., ½ inch). Accordingly, the height range recited above may be from ½ to 1½ inches.

For each alignment guide 80, its railing 88 attaches to the lower side 38 of the platform 28 by screws, bolts or other fasteners. Similarly, each railing housing 84 attaches to the desktop 26b by fasteners such as screws, bolts, clamps or the like. The fasteners may secure the railing housing 84 directly to the desktop 26b, e.g., by embedding some portion of such fasteners into the desktop. However, for a desktop 26b having an overhang at its rear edge 68, a clamp and other similar non-damaging fasteners may be used. Accordingly, embodiments of the monitor mounting system 20 can be retro-fitted to a desktop without damaging the desktop.

Additionally, as shown in FIG. 4, a pair of extensions 90 may be attached to the lower side 38 so that a portion of each extension extends toward the workstation user. Such extension 90 pairs may be used as (or combined with) a hand grip 91 for moving the platform 28 (and the attached rack of monitors 33), and/or may used as computer keyboard support. Of course other types of hand grips are also within the scope of the monitor mounting system 20. In particular, instead of a single hand grip bar (as shown in FIG. 4), separate hand grips may be provided.

It is worth noting that an embodiment of the monitor mounting system 20 may use alignment guides 80 without rollers 34. In such an embodiment, the alignment guides 80 must support the weight of the monitor mounting system 20. Accordingly, each of the alignment guides 80 can be attached between the platform 28 and the desktop 26b so that when the system 20 is operational, the guide's sides 92 (FIG. 4) that face one of the lower side 38 or desktop 26b in the above described embodiments are now secured in a vertical orientation. That is, for each of the guides 80, its opposing edges 94 (FIG. 4) are secured to a different one of the lower side 38 and the desktop 26b. However, it is likely that additional alignment guides 80 would be used in this embodiment; e.g., at least one additional alignment guide 80 adjacent each of the lateral ends 48.

The platform 28 may be shaped to fit on the desktop 26b of the workstation 24 substantially without interfering with a user's workspace between the user and the monitors 33 mounted on the rack 32. In particular, since the desktop 26b has, in the embodiment shown in FIG. 3, a generally arcuate front edge 64, the front edge 52 of the platform 28 follows a similar contour. Additionally, the rear edge 56 of the platform 28 generally follows the contour of the back desk edge 68.

Figure 5:
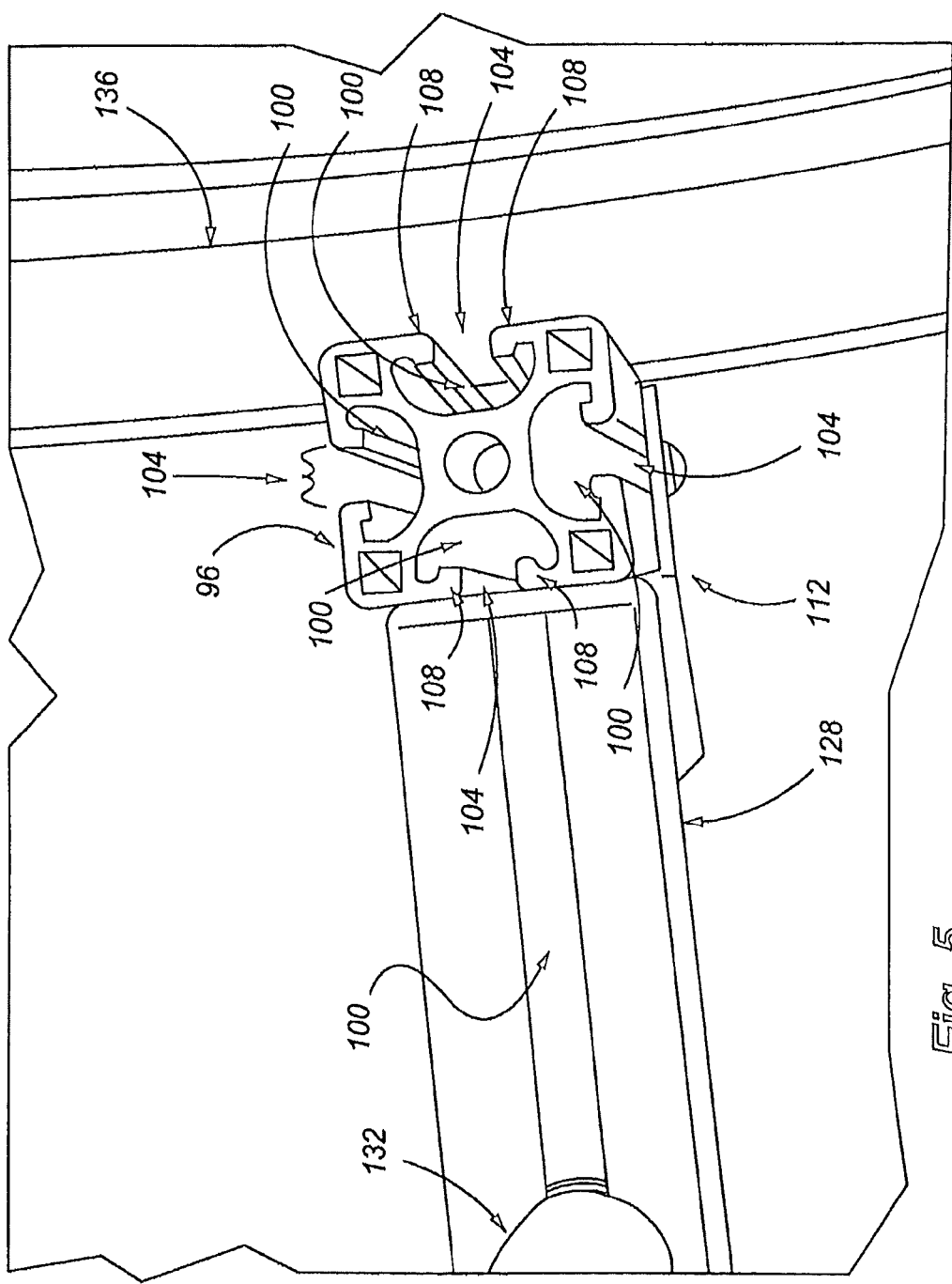
FIG. 5 shows an embodiment of a cross section of a post 96.
Figure 14:
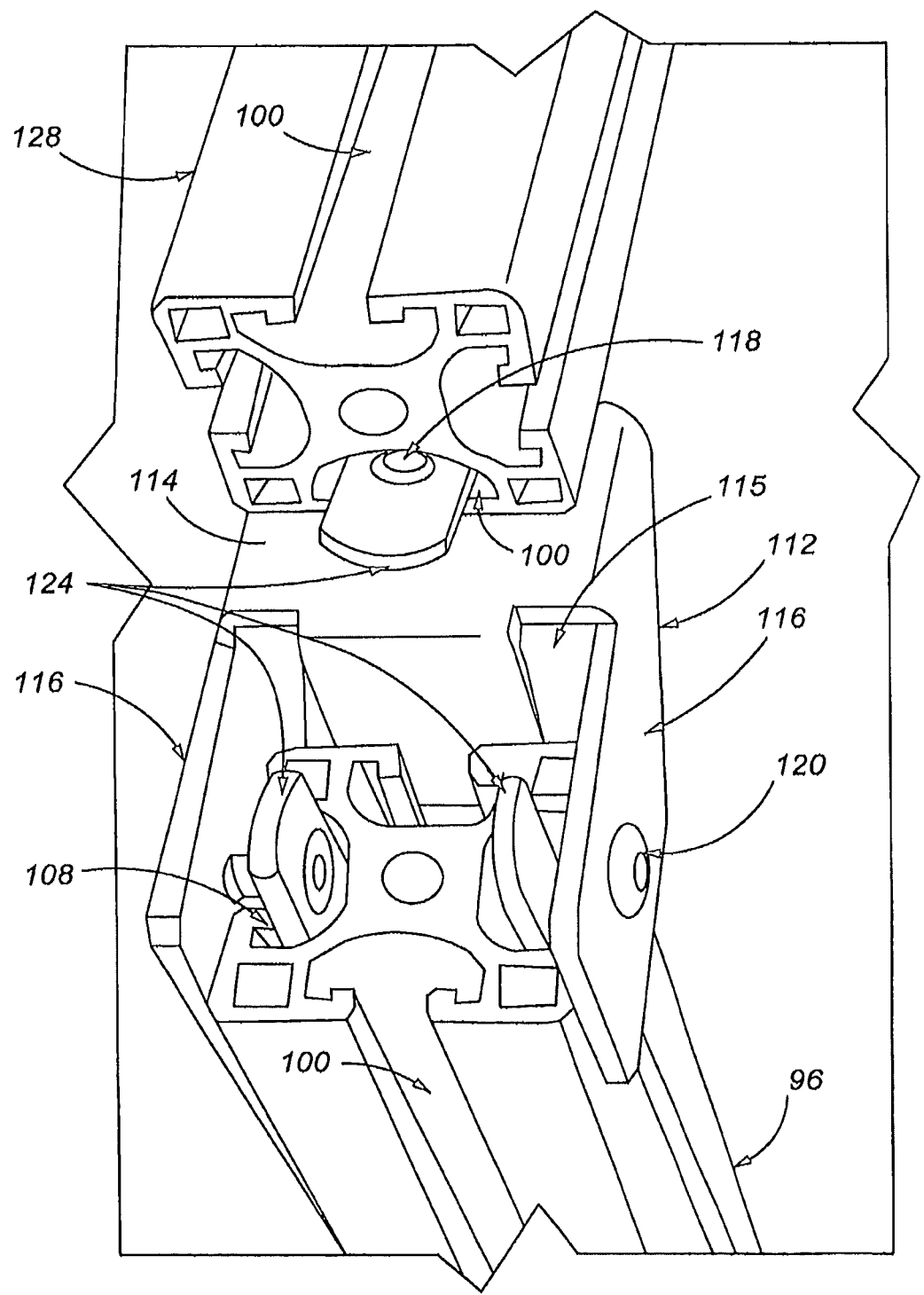
FIG. 14 shows the "U" shaped attachment 112.

Referring now to the rack or frame 32, it includes vertical posts 96 (FIG. 2) that have their lower ends secured to the platform 28 for conveying the weight of, e.g., the monitors 33 to the platform 28. In at least one embodiment, each post 96 is secured to the platform 28 by a threaded bolt through the platform 28 and into a threaded hole in the post 96. A horizontal cross sectional view of a post 96 is shown in FIG. 5. Note that the cross section (as well as the cross section of other members, such as, a rail 136 and/or a horizontal extension 128, each described below) is substantially square with each side having a recess 100 (also denoted variously herein 100a, 100b, and 100x) extending the length of the post 96 (and/or the rail 136, or the horizontal extension 128), wherein each such recess has a restricted opening 104 defined by reinforced ledges 108 also extending the length of the post 96 (alternatively, extending the length of the rail 136, and/or the horizontal extension 128). However, note that the cross section of the post 96 (and/or the rail 136 or the horizontal extension 128) can have other shapes besides the generally square shape shown in FIG. 5. In particular, such a cross section (excluding the shape of any recesses similar to recesses 100) may be circular, oval, octagonal or another polygonal shape. Various attachments can be secured to the posts 96 (and/or the rail 136 or the horizontal extension 128) by providing post fasteners that enter one of the openings 104, and grip the adjacent ledges 108. One such post fastener is the "U" shaped attachment 112 shown in FIGS. 5, 6 and (best shown in) FIG. 14 having two opposing trapezoidal side plates 116, wherein a corresponding one of the posts 96 is provided within the recess 115 of the "U" shaped attachment, this recess being between the two trapezoidal side plates 116 that form the opposing sides of the "U". Note that the "U" shaped attachment 112 includes a shelf 114 that connects the two side plates 116 together, and the shelf has a bore therethrough (not shown) through which a bolt 118 is provided for threadably attaching a T-nut 124 thereto. As best shown in FIG. 14, the "U" shaped attachment 112 attaches to both the corresponding post 96, and to the underneath side of a corresponding horizontal extension 128 via a T-nut 124 that is tightened against the corresponding reinforced ledges 108 (e.g., as shown in FIG. 5) of each recess 100 shown in FIG. 14.

For attaching the "U" shaped attachment 112 to its corresponding post 96, each trapezoidal plate 116 has a bolt 120 extending therethrough into one of the recesses 100 covered by the plate 116, wherein a T-nut 124 is attached to the bolt 120 within the recess 100 for securing the trapezoidal plate to the side of the post having the recess. A vertical bar 132 may be attached to each horizontal extension 128 by a bolt and nut combination (not shown) that may be also identical to the combination of the bolt 204 and T-nut 124. For example, since the vertical bar 132 may be hollow, such a bolt 204 can have its shaft fitted through a bore in the end of bar 132 for contacting the horizontal extension 128 so that the head of this bolt is unable to pass through the bore, and accordingly remains within the hollow of the bar. A T-nut 124 can then be threaded onto this shaft which extends out the lower end of the bar 128 contacting the horizontal extension 128. Accordingly, since the horizontal extension 128 may include recesses 100 (FIGS. 5 and 6) along its longitudinal extent (i.e., horizontal extent in FIGS. 5 and 6), once the T-nut is threaded loosely onto the bolt shaft, the T-nut can be slid into the upper most recess 100 of the horizontal extension. Then, the T-nut can be tightened on the bolt 204 (whose head is inside the bar 132) so that the T-nut tightly grabs the recess interior sides (not shown, but in at least one embodiment, identical to the ledges 108 of the post 96 of FIG. 5) of the upper most recess 100 of the extension 128.

The combination of the attachment 112, the extension 128 and the bar 132 may be used as, e.g., a support for computer cabling, a support for one or more electrical power outlets or power distribution centers, a support for mounting for one or more lighting fixtures, a support for one or more audio speakers, and/or a support for various environmental controls (such as air flow, temperature, and ambient lighting controls). Note that post fasteners (e.g., the "U" shaped post fastener 112 alone, or in combination with an extension 128 and/or the bar 132) may be additionally used as a support for mounting a phone, as a support for mounting a holder of a workstation user headset, as a support for mounting a chalk or whiteboard, and/or other items that are desirable for a workstation user to have in arms length proximity when working at the workstation 24.

Alternative embodiments of such post fasteners include one or more frictional fasteners for adjustably securing attachments vertically along the posts 96, wherein such post fasteners frictionally grip the interior surfaces of the recess 100 when in a first position, and release their grip when provided in a second position. For example, the center of gravity of such a post fastener may offset from its post 96 sufficiently so that the portions of the fastener that reside in the opposing recesses 100 of the post frictionally bind therein due to the gravity induced torque on the post fastener. Additionally, post fasteners may include various clamps that can be secured to a post 96. In another embodiment, such a fastener may include a ratcheting mechanism that is movable up a post 96 while the ratchets are engaged to the post, and is movable down the post when the ratchets are disengaged.

Figure 7:
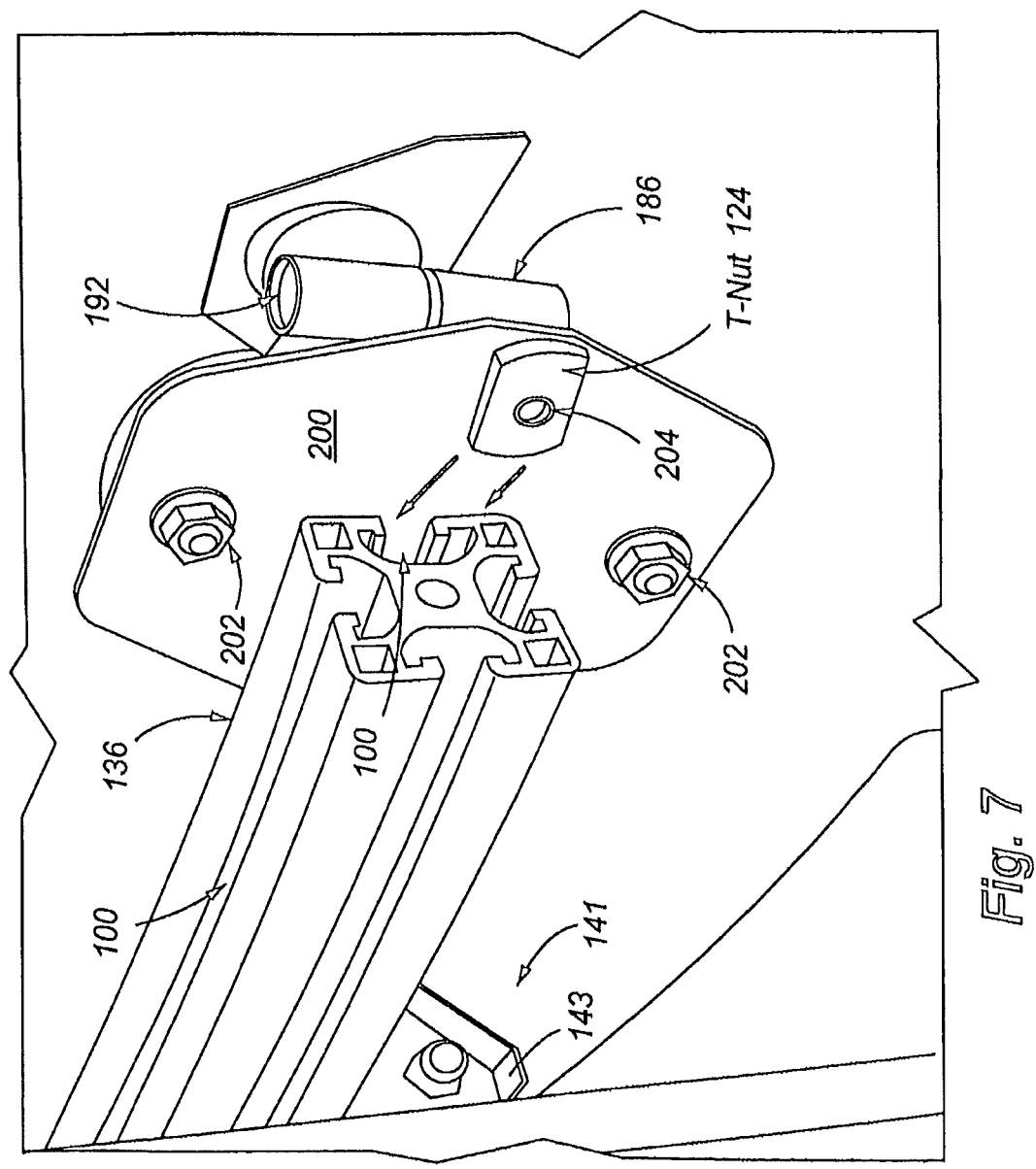
FIG. 7 shows a cross section of an embodiment of a rail 136 together with an orientable subassembly 154 for mounting thereon.
Figure 8:
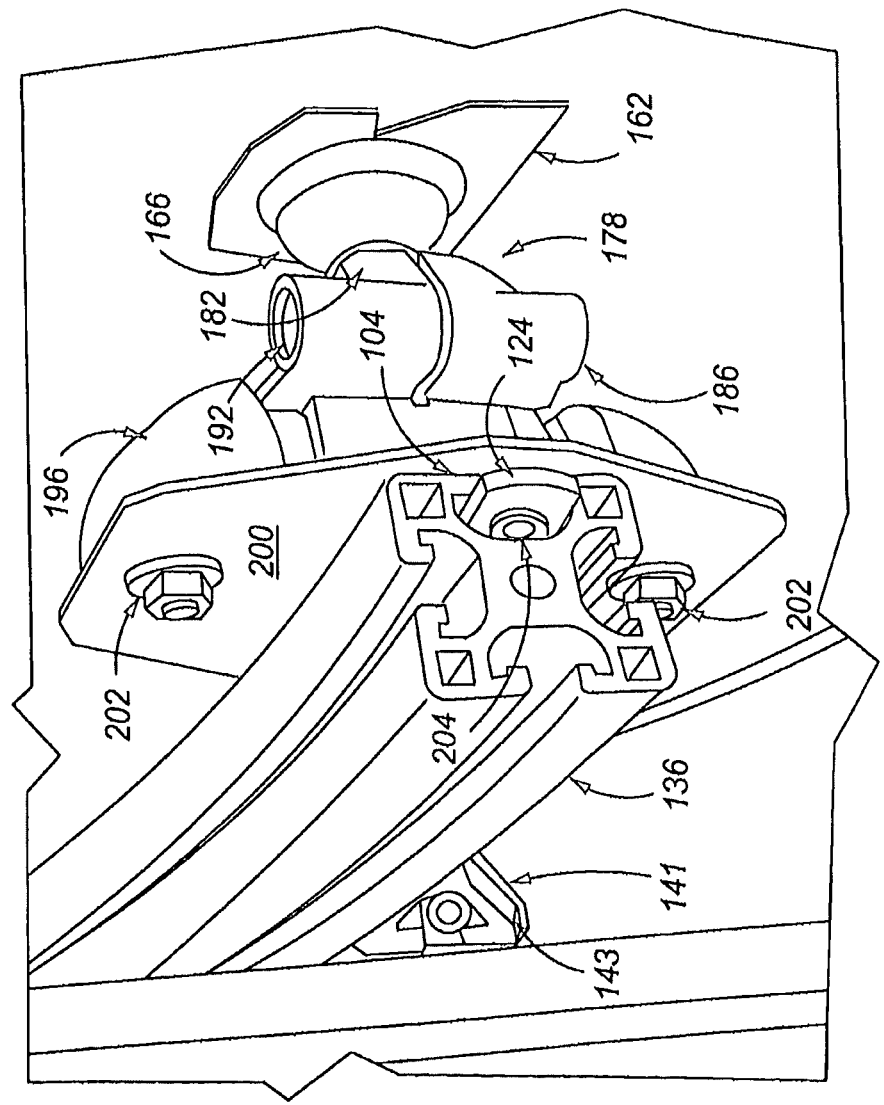
FIG. 8 shows another view of the cross section of the rail 136 together with the orientable subassembly 154 mounted thereon.

There may be two to five or more posts 96 secured vertically to the platform 28. In the embodiment shown in FIGS. 1-3, three such posts 96 are positioned so that each curved horizontal rail 136 is secured to each of the three posts. In fact, the embodiment of FIGS. 1-3 includes two vertically spaced apart rails 136 (FIG. 2). Each rail 136 may be secured to the posts 96 by various types of post fasteners as described above so that the rails are vertically adjustable along the vertical length of the posts 96. One such post fastener 141 is shown in FIGS. 7 and 8, wherein a T-nut (not shown) secures a rail support 143 into a recess 100a (FIG. 6) which is identical to the recesses 100. Note that such a post fastener 141 may be an embodiment of the "U" shaped attachment 112. In one embodiment, the post fastner 143 also secures a rail 136 thereto by a bolt 204 and T-nut 124 combination (as shown in FIGS. 7 and 8), wherein when the bolt extends through a shelf (similar to shelf 114 of FIG. 14), the T-nut is then threaded onto the bolt, the T-nut is then inserted into the bottom recess 100 of the rail, and then the T-nut is tightened on the bolt so that the T-nut is tightly secured within this bottom recess. In another embodiment, instead of a bolt, T-nut combination, the rail and the fastner are secured together by a rod (not shown) having an expanded first end for securing in the bottom recess 100 of the rail, and a second end having a rotatable lever, wherein in a first lever position, the expanded first end is slidable within the bottom recess, and in a second lever position, the expanded first end is tightly wedged against the reinforced ledges 108 of the bottom recess.

Since the rails 136 extend across a plurality of the posts 96, in at least some embodiments, it is preferred that each rail be attached to the posts at predetermined positions via bolts that extend into predetermined threaded bolt holes in each post. However, the rail(s) 136 may be fixedly attached to the posts 96 such as by welding in some embodiments.

The attachment of the rail(s) 136 to the posts 96 provides for a vertical spacing between the rails 136, and between the lower rail and the platform 28, wherein this spacing is effective for:

(a) mounting a large monitor (having a display screen 138 of, e.g., 21 inches in diagonal extent) therebetween, as shown in FIG. 2, wherein each monitor is mounted to a rail 136 from substantially a center of the monitor as described hereinbelow, and wherein preferably there is a space between each monitor 33 on the lower row and the top surface of the platform 28 of about at least ½ inches, and up to 10 inches depending on, e.g., how best a user viewing angle between 15 degrees and 20 degrees below the horizontal eye level can be achieved, and (b) achieving a view angle from a workstation user's horizontal eye level to the center of each monitor screen of between 15° and 20° below the user's horizontal eye level. Accordingly, the distance between the platform 28 and the lower rail 136 may be in the range of approximately 12 inches to 24 inches, and the distance between the two rails is generally less than 30 inches.

As indicated in FIG. 3, the rail(s) 136 may be curved so that distance between each monitor display 138, and the location of where a workstation 24 user is likely to view the monitor displays is substantially equal for each monitor in a single horizontal row, and there is only a slight difference in this distance for monitor displays 138 in different rows. For example, in FIG. 3, the variation in distances between the point 140 (corresponding to a location between a user's eyes), and a center point of each of the displays 138 of the monitors 33 (viewed by the user) in a single row may be at most ¾ to 1½ inches. Additionally, the maximal variation in distances between the point 140 and a center point of each of the displays 138 of monitors 33 (viewed by the user) in different rows is less than 2 inches. Moreover, since these variations are substantially independent of the monitor 33 viewing distance for monitors viewed within a range of 20 inches to 33 inches (which accommodates the preferred viewing range of approximately 95% of users), nearly all workstation 24 users are able to view all monitors 33 with little (if any) need to change their focal distance when switching their view between monitors 33. Thus, the monitor mounting system 20 reduces eye fatigue and/or strain of workstation 24 users. Additionally, the rail(s) 136 may extend through an arc (from the point 140) in a range of 60 degrees to 110 degrees (with this arc being approximately 90 degrees in FIG. 3). Thus, a workstation 24 user does not need to turn his/her head more than a maximum of about 30 to 40 degrees (and preferably no more 35 degrees) in any one horizontal direction to face any one of the monitor displays 138.

Figure 9:
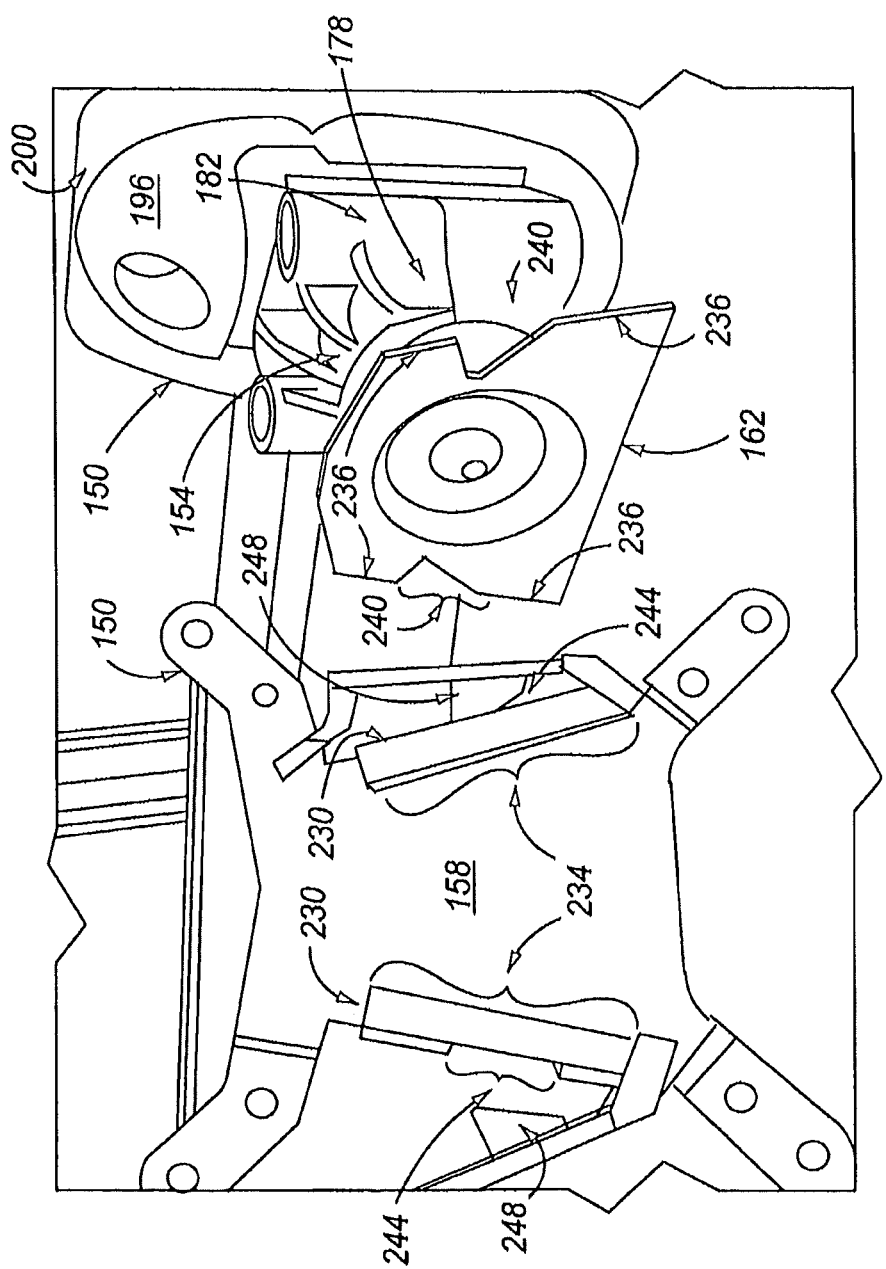
FIG. 9 shows the mounting assembly 150 for mounting a monitor 33 to a rail 136.

FIGS. 6 through 9 show various portions the monitor mounting assembly 150 (which best shown in its entirety in FIG. 9). In particular, the monitor mounting assembly 150 includes a orientable subassembly 154 (best shown FIGS. 6 and 8), and a monitor mount plate 158 that attaches to the back of a monitor 33 for securing the monitor to the monitor mounting assembly 150 as will be described further hereinbelow.

The orientable subassembly 154 includes a monitor attachment plate 162 which mates with the monitor mount plate 158 (as described hereinbelow) for adjustably fixing a corresponding one of the monitors 33 to the rail 136 in a desired angular position, e.g., relative to a workstation 24 user's viewing angle to the monitor. In particular, the ball and socket may be used that allows the attached monitor 33 to be adjusted (e.g., tilted) through a conical angle of 150 degrees, wherein a normal to the monitor display 138 may vary by 150 degrees in all directions. That is, such a normal may vary by 75 degrees in all directions from, e.g., a horizontal axis that goes through the center of the ball 174 (FIG. 6) and towards a properly positioned workstation user within the space 72. FIG. 1 shows monitors 33 that have different tilts relative to a rail 136 upon which the monitors are supported.

Figure 6:
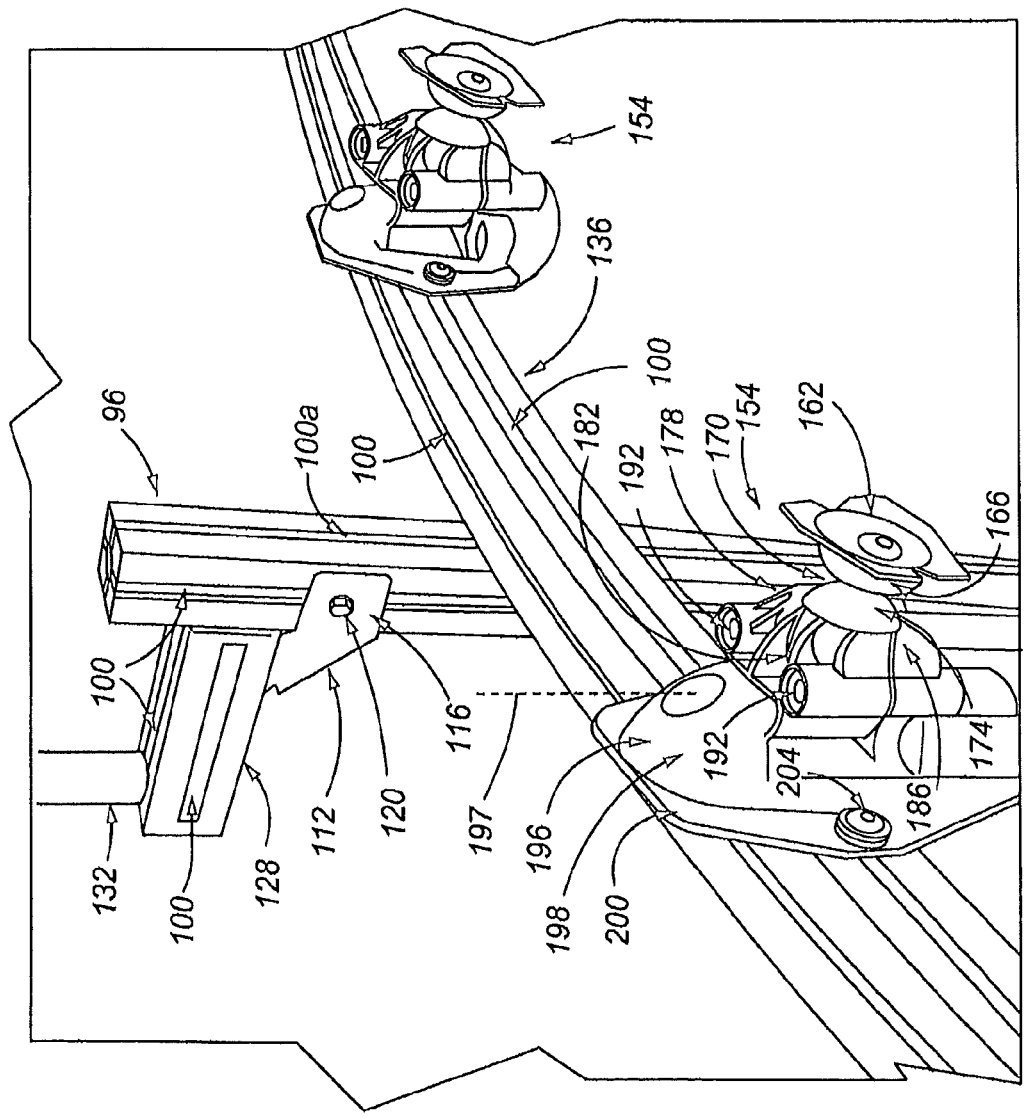
FIG. 6 shows an orientable subassembly 154 mounted to a rail 136 of an embodiment of the monitor mounting system 20.
Figure 11:
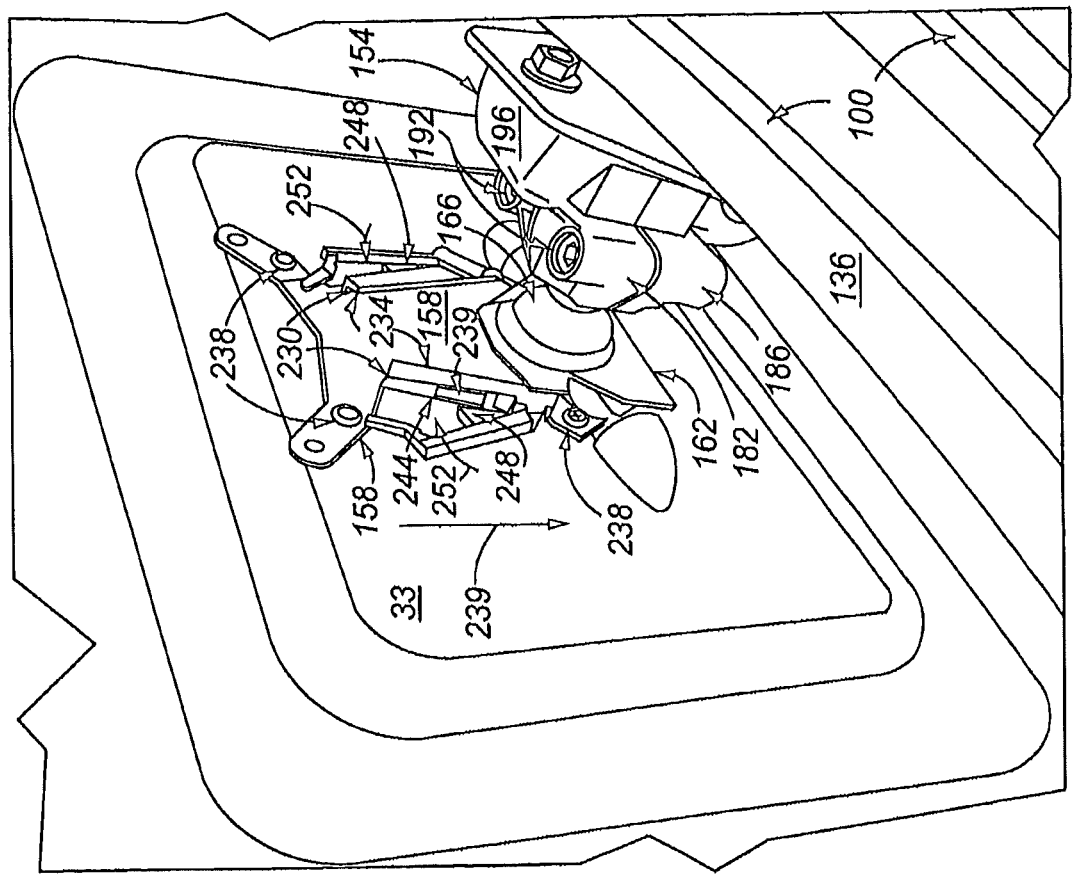
FIG. 11 shows the mounting of a monitor 33 on to the orientable subassembly 154 which is in turn mounted on a rail 136.
Figure 12:
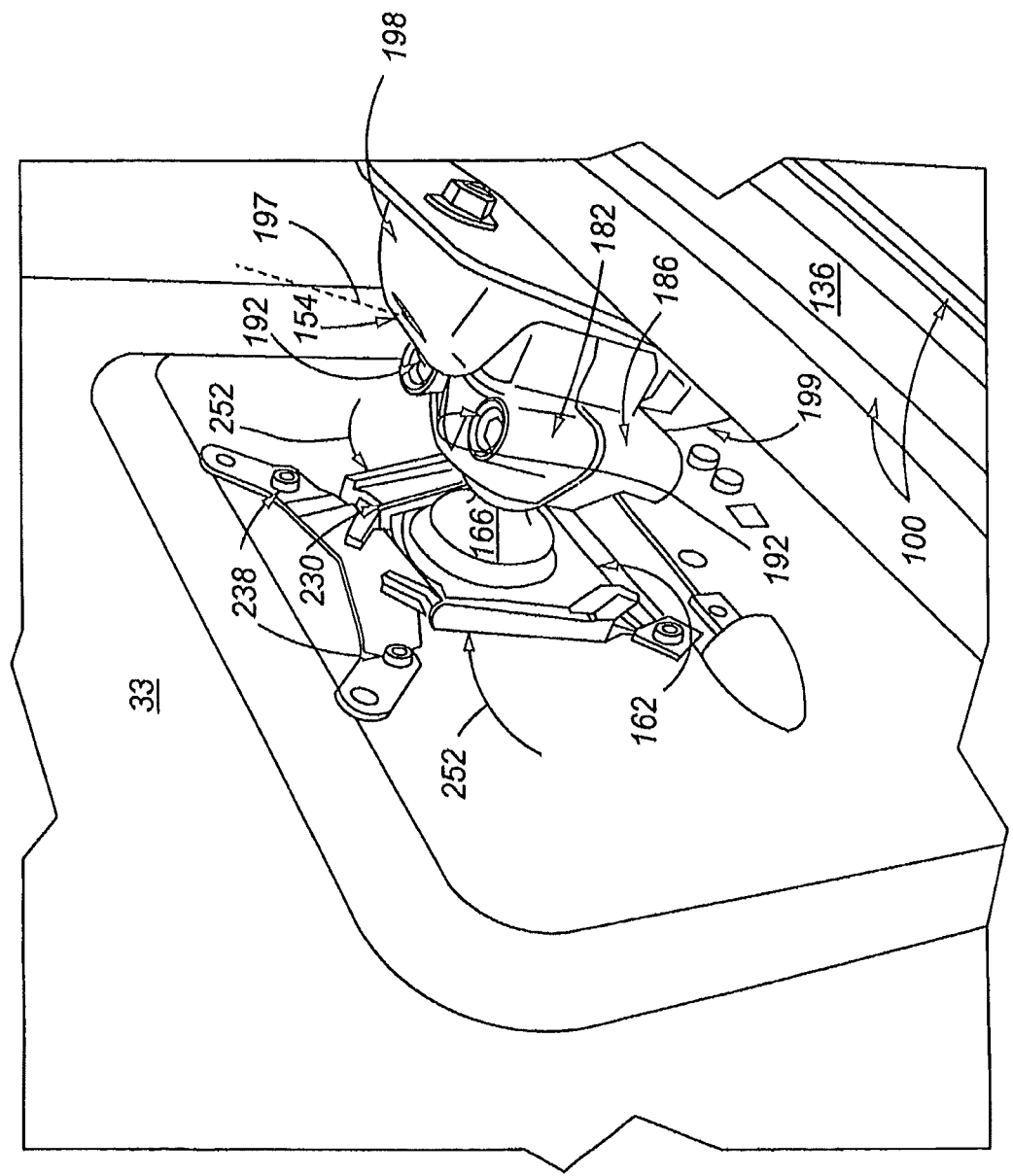
FIG. 12 shows another view of the monitor 33 mounted on the orientable subassembly 154 which is in turn mounted on a rail 136.

Additionally, referring to FIGS. 6, 11, and 12, attached to the monitor attachment plate 162 is a monitor angular adjustment piece 170 (FIG. 6) included in the orientable subassembly 154. The monitor angular adjustment piece 170, in turn, includes a hemispherical portion 166 and also includes the ball 174 referred to hereinabove. At least a majority of the ball 174 is enclosed within a socket 178 (also included in the orientable subassembly 154) having an upper socket member 182 and a lower socket member 186, which in at least one embodiment are mirror images of one another. The upper and lower socket members 182 and 186 are secured together by two hex head bolts 192 (more generally, tension adjusters) for tightening and loosening the members 182 and 186 about the ball 174, these bolts 192 are also included in the orientable subassembly 154. Thus, when the bolts 192 are loosened, the workstation 24 user's viewing angle of the display 138 may be adjusted, and when the bolts 192 are tightened, the display can have its angular orientation fixed. Note that the bolts 192 may be replaced by screws, nut and bolt combinations, or other adjustable tightening components such as a quick release assembly used to tighten and release bicycle tires to the frame of a bicycle via a manually pivotable lever. The upper and lower socket members 182 and 186 are pivotally attached to a rail attachment member 196 (also included in the orientable subassembly 154) by a pivot pin (not shown) of the rail attachment member, wherein the pivot pin is coincident with pivot axis 197 (dashed line, FIGS. 6 and 12), and wherein the pivot pin is seated within the rail attachment member 196 and extends between an upper portion 198 of the rail attachment member and a lower portion 199 of the rail attachment member. For the monitor 33 attached to the orientable subassembly 154 having the pivot pin, the pivot pin allows this monitor to rotate about the axis 197 through a range of 90 degrees to 120 degrees. Accordingly, when this range is combined with the angular range provided by the ball 174 in the socket formed by the upper and lower socket members 182 and 186, the entire horizontal angular range may be greater than 120 degrees, and in at least some embodiments, 180 degrees or greater.

Figure 15:
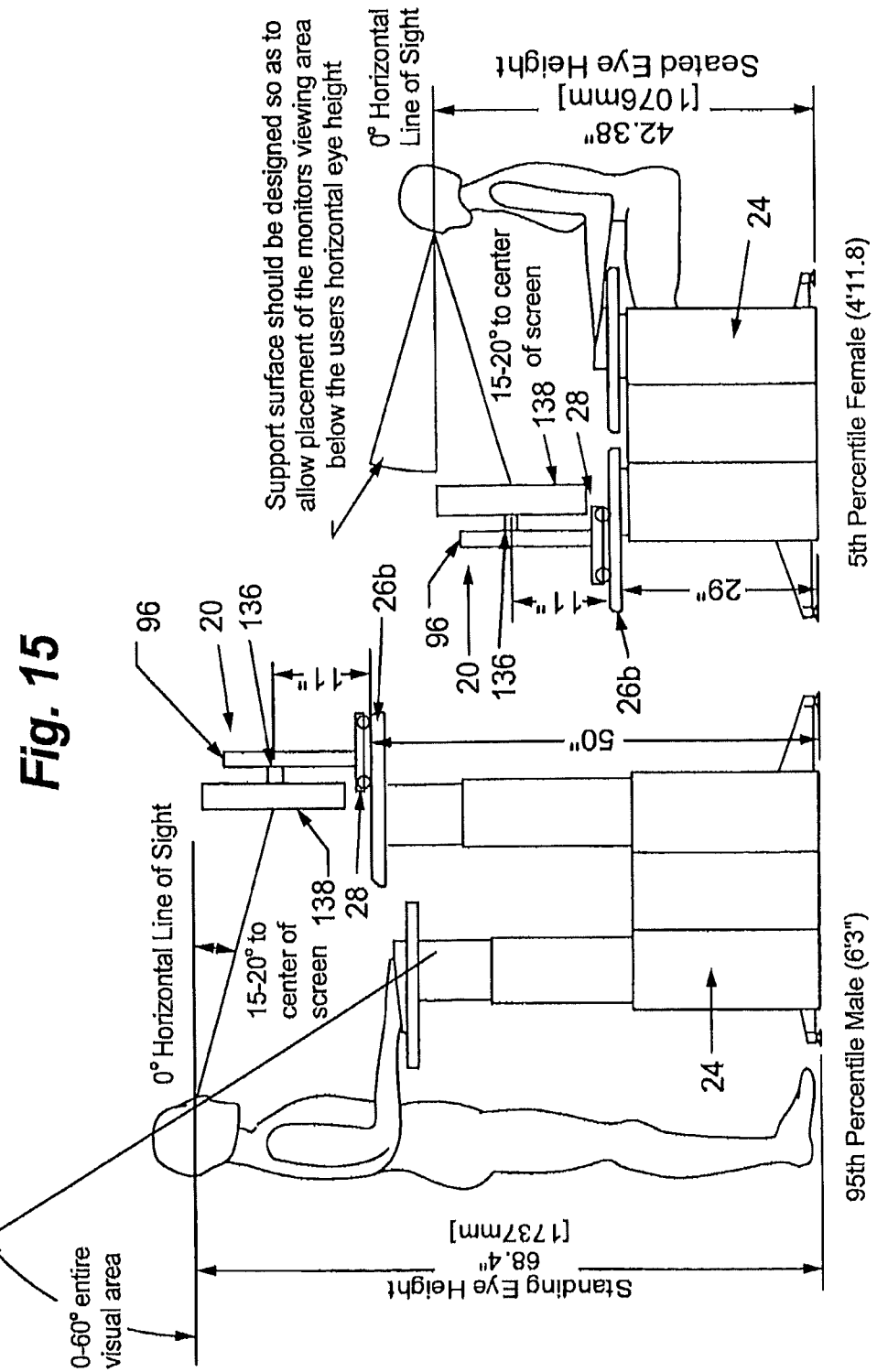
FIG. 15 shows a preferred orientation to the monitor mounting system 20 of two users, i.e., a standing male in the 95$^{th}$ percentile in height (having standard body proportions) on the left, and a sitting female in the 5$^{th}$ percentile in height (having standard body proportions) on the right.

The rail attachment member 196 attaches to a rail 136 as shown in FIGS. 7 and 8. In particular, there may be a back plate 200 for the rail attachment member 196, wherein the back plate may be integral with the rail attachment member 196, or (as shown in FIGS. 7 and 8) a separate part to which the rail attachment member is secured by two bolt and nut pairs 202, wherein the bolts thereof each may extend through the rail attachment member. Note that the back plate 200 also has a pair of horizontally spaced apart bores (not shown). Through each such bore a bolt 204 (FIGS. 6 and 7) extends, and a T-nut 124 (FIG. 7) threadably attaches thereto (only one such bolt/nut pair is shown in the figures). Accordingly, as shown in FIG. 7, when the T-nut 124 is oriented substantially as shown relative to the recess 100, the T-nut can slide into the recess and is held therein by the reinforced ledges 108. When both T-nuts 124 are slidably received in the recess 100, the entire monitor mounting assembly 150 can slide horizontally along the rail 136 until a desired position is reached, and then the pair of T-nuts 124 can be tightened on their bolts 204 to secure the monitor mounting assembly 150 in place. Thus, a monitor 33 attached to the monitor mounting assembly 150, can be both: (a) horizontally adjusted along a rail 136, and additionally (b) angularly positioned so that the monitor display 138 can be tilted vertically relative to a horizontal axis 212 (FIG. 2, upper right-hand monitor 33) of the display 138, and rotated relative to a vertical axis 216 of the display). Accordingly, such adjustments and angular positioning of the monitors 33 facilitate a reduction of both user eye strain and skeletal muscle fatigue since workstation 24 users can readily view the monitor displays 138. Such adjustment is desirable so that the plane of each of the monitor displays 138 (FIGS. 2 and 3), at the center of the display, can be desirably oriented to be substantially normal to the direction that a workstation user views the display 138. Additionally, the TABLE A below compares ergonomic features of various embodiments of the monitor mounting system 20 (installed on a desktop of an appropriate workstation 24) in comparison to the ergonomic criteria in the standards document: BSR/HFES 100 Human Factors Engineering of Computer Workstations© 2002 HFES. It may be advantageous for the reader to review FIG. 15 in conjunction with TABLE A to obtain a more complete appreciation of how the monitor mounting system 20 assists in satisfying ergonomic criteria for users viewing multiple monitor displays simultaneously.

TABLE A

| Ergonomic Performance Criteria | BSR/HFES 100 | Monitor Mounting System 20 | Comments/Explanation |
|---|---|---|---|
| Monitor display (138) adjustment range in a vertical direction; e.g. by adjusting the vertical height of the rails (136). | Requires gaze angle of −15° to −20° from horizontal eye level to center of monitor screen BSR/HFES 100 Section 5.2.4.3 pg. 18 | Designed for compliance for a range of users from $5^{th}$ percentile female (42.35" eye ht.) to $95^{th}$ percentile male (68.4" eye height). | For an embodiment of system 20 for use on a fixed height desktop designed for seated use requires a rail (136) height adjustment range of 12" (e.g., 8" to 20") to accommodate a range from a $5^{th}$ % seated female to a $95^{th}$ % seated male user. For an embodiment of system 20 for use on a fixed height desktop designed for standing use requires a rail (136) height adjustment range of 16" (e.g., 8" to 24") to accommodate a range from a $5^{th}$ % standing female to a $95^{th}$ % standing male user. |
| Monitor display 138 (up to 21" diagonal display) height required for a $5^{th}$ percentile seated female, user (42.35" eye height) with monitor mounting system 20 installed on desktop of adjustable height workstation 24. | Requires gaze angle of −15° to −20° from horizontal eye level to center of monitor screen BSR/HFES 100 Section 5.2.4.3 pg. 18 | Rail 136 is mounted in a range of 8" to 11" above a movable desktop 20 which can achieve a lowest adjustment of 23". | For an embodiment of system 20 for use on an adjustable height desktop (e.g., 26a and 26b) requires a lowest adjustment range of 23" from the floor to achieve −15° to −20° gaze angle from horizontal eye level of $5^{th}$ percentile seated female user. |
| Monitor display 138 (up to 21" diagonal) height required for a $95^{th}$ percentile standing male (eye height 68.4") user with monitor mounting system 20 installed on desktop of adjustable height workstation 24. | Requires gaze angle of −15° to −20° from horizontal eye level to center of monitor screen BSR/HFES 100 Section 5.2.4.3 pg 18. | Rail 136 is mounted in a range of 8" to 11" above a movable desktop 20 which can achieve a highest adjustment of 50". | For an embodiment of system 20 for use on an adjustale height desktop (e.g., 26a and 26b) requires a highest adjustment range of 50" from the floor to achieve −15° to −20° gaze angle from horizontal eye level of $95^{th}$ percentile standing male user (68.4" eye height). |

TABLE A-continued

| Ergonomic Performance Criteria | BSR/HFES 100 | Monitor Mounting System 20 | Comments/Explanation |
| --- | --- | --- | --- |
| Focal length (viewing distance) adjustability range; i.e. horizontal movement of the monitor mounting system 20 in the directions of the arrow 76 (FIG. 2). | 20" to 33" | 20" to 33" | BSR/HFES 100 guidelines recommend focal length adjustability from 50 cm (19.68") minimum to 83 cm (33") maximum. Section 5.2.4.3 pg. 19. |

Note to Table A:
The publication, Human Factors Engineering of Computer Workstations, BSR/HFES 100, Mar. 31, 2002 is referenced as the source for ergonomic guidelines - i.e. monitor view angles, focal lengths and other ergonomic requirements for optimal viewing - that is utilized in the design of the monitor mounting system 20 and this reference is fully incorporated herein by reference.

Figure 10:
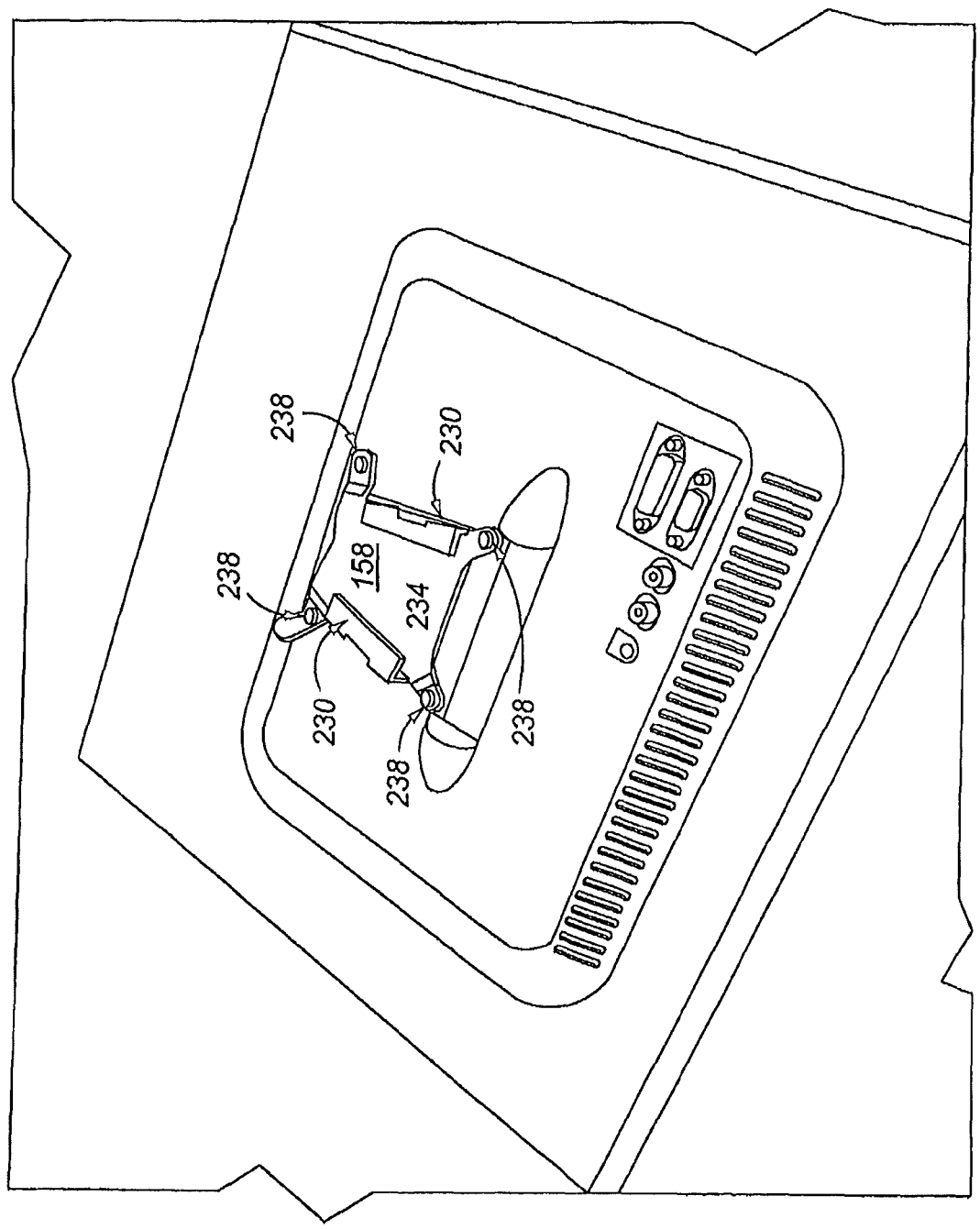
FIG. 10 shows the back of a monitor 33 with an embodiment of the monitor mount plate 158 (of the mounting assembly 150) attached thereto.

FIGS. 9 through 11 illustrate how a monitor 33 is attached to the monitor mount plate 158, and additionally how the monitor mount plate 158 is secured to the monitor attachment plate 162. In FIG. 9, the monitor mount plate 158 is shown as having folds 230 that form opposing channels 234 which incline toward one another, with the distance between the upper ends of the channels being smaller than the distance between the lower ends of the channels. When the monitor mount plate 158 is properly attached to the back of a monitor 33 (FIGS. 10 and 11), preferably by screws 238 threaded into the standardized VESA patterned attachment holes provided in the back of most flat panel monitors 33, the inclination of the channels 234 mates with the inclined edges 236 of the monitor attachment plate 162 (FIGS. 9 and 11) for supporting the monitor 33 on the monitor mounting assembly 150. In particular, when a monitor 33 is positioned as shown in FIG. 11 so that the monitor can be moved according to arrow 239 for mating the channels 234 and edges 236, the inclination of the mating channels 234 and edges 236 cause the monitor 33 to be aligned on the monitor attachment plate 162 so that each of the four edges 236 rests against the interior crease of one of the folds 230. Thus, the cutouts 240 in the monitor attachment plate 162 align with slots 244 in the folds 230 so that the pivoting tab locks 248 can be rotated (according to the rotational direction arrows 252, FIG. 11) through the slots 244 to seat within a corresponding one of the cutouts 240 thereby locking the monitor 33 to the monitor mounting assembly 150. Note that an embodiment of the monitor mounting assembly 150 is manufactured by Knape and Vogt located at 2700 Oak Industrial Drive North East, Grand Rapids, Mich. 49505, and having a model number of MA100B.

Figure 13:
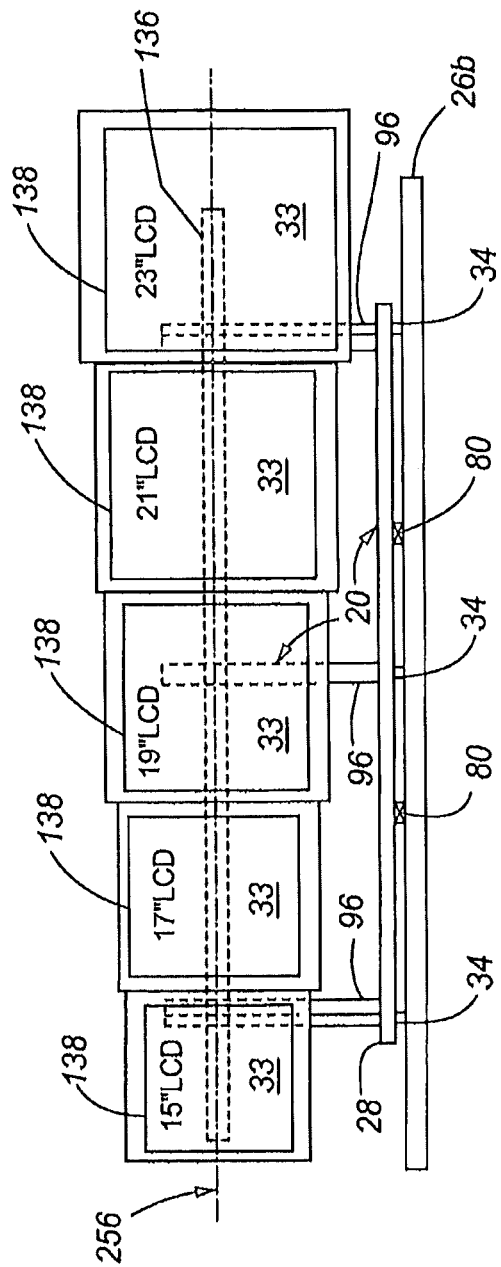
FIG. 13 shows a front view of an alternative embodiment of the monitor mounting system 20.

FIG. 13 shows another embodiment of the monitor mounting system 20, wherein there is a single row of monitors 33. This embodiment illustrates the mounting of monitors 33 that vary in size from 15 inches to 23 inches (diagonally across the display 138, as monitors are normally measured). However, even though the monitors 33 vary in size, the centerline that horizontally bisects each monitor's display 138 is coincident with the axis 256. Thus, a workstation 24 user needs to only shift or move his/her eyes horizontally when shifting his/her focus from one display 138 to another. Moreover, such an alignment of the horizontal centerlines of each monitor 33 in a row also is achieved in multi-row embodiments of the monitor mounting system 20 since the VESA hole pattern is generally centered on the back of each monitor 33. However, if there is no central hole pattern on the back of a monitor 33, then such a hole pattern can be readily provided as one skilled in the art will understand.

Note that embodiments of the monitor mounting system 20 can be used with a workstation having a single non-split desktop. Additionally the monitor mounting system 20 can be used with a desktop that is rectangular, oval or "U" shaped. The primary constraint to be satisfied is that the desktop have a sufficient amount of surface area to support the platform 28 along the extent of its movement, and that the desktop be sufficiently stable and strong to support the monitor mounting system 20.

In some embodiments, indicia may be provided with the monitor mounting system 20 for identifying the distance of the monitor mounting system from, e.g., a workstation 24 user. Thus, a first user may easily adjust the distance of the monitor mounting system 20 to a first preferred distance by moving, e.g., the platform 28 to a first position indicated on the indicia, and a second user may easily adjust the distance of the monitor mounting system 20 to a second preferred distance by moving the platform 28 to a second position indicated on the indicia. The indicia may be attached to the desktop upon which the monitor mounting system 20 rolls (or otherwise moves); e.g., the indicia may be provided on an adhesive tape or laminate that extents along the platform 28 path of movement so that distances to the front edge of the desktop (e.g., desktop 26b) can be determined. Alternatively, such indicia may be provided by distance measurement device that detects movement of the platform 28; e.g., a mechanical, optical, or electro-mechanical distance measuring device attached to one of the rollers 34 for measuring platform movement. Moreover, in a motorized embodiment of the monitor mounting system 20, a workstation user may input a preferred distance to which he/she desires the monitor mounting system to be moved.

In some embodiments, the monitor mounting system 20 may include various types of brakes or friction inducing mechanisms for assuring that the monitor mounting system stays in a preferred position. Such brakes or friction mechanisms may contact the desktop: (a) at all times thereby adding sufficient friction to prevent most undesired monitor mounting system 20 movement (e.g., due to a slanted desktop, or an inadvertent bump of the monitor mounting system), or (b) only when a workstation user activates the brake or friction mechanism (e.g., the user may move a lever that activates and deactivates the brake or friction mechanism). Note that the portion (if any) of the brake or friction mechanism that contacts the desktop may be felt, rubber, or other material that will not mar the desktop. In one embodiment, the brake may be applied to one or more of rollers 34 instead of contacting the desktop; e.g., a user activatable clamp may grip one of the rollers to prevent it from rolling on the desktop.

In some embodiments, the lower side 38 of the platform 28 may include cutouts or raised portions that provide space for the platform to move over (and hide) various items, e.g., used infrequently by a workstation user. For example, operations manuals, emergency procedure manuals, etc. Additionally and/or alternatively, the upper side of the platform 28 may include various item holders or attachments; e.g., a holder for pens and pencils, an attachment for a phone, holders for paper clips, a console attachment for turning on and off various electrical devices associated with the workstation (e.g., turning on and off all monitors 33 simultaneously).

In some embodiments, the monitor mounting system 20 may include various covers or housings. In particular, a housing or hood may be supported on the platform 28 behind the monitors 33, and/or provided adjacent to (and attached to) the rails 96. The hood may be used to hide the potentially extensive amount of cabling that may be needed to operate the monitors 33 (and other electronic devices, e.g., speakers, etc.) supported by the monitor mounting system 20. Such a hood may substantially enclose the back of the monitor mounting system 20 that faces away from where a user is positioned to view the monitors 33. Moreover, the hood may include one or more conduits through which all monitor 33 cables extend, thus making it easier to cluster the cables so that, e.g., there is a reduced likelihood of personnel tripping or inadvertently jerking on a cable and damaging equipment. Additionally, such a hood may also include a cable bin or receptacle for storing excess cabling so that such cabling is both readily accessible and not laying on the floor.

The embodiments of the monitor mounting system 20 are particularly useful for a worker or user: (a) taking emergency calls, e.g., in a E-911 emergency center, (b) monitoring a closed circuit television system having a large number of television displays to monitor, (c) monitoring any large number displays such as security or surveillance centers (e.g., building security, monitoring game play in casinos, military command and control facilities, concert or event security and crowd control, monitoring of merchandise to identify shoplifters, etc.), and (d) other monitoring tasks such as an array of patient monitors at a nurse's station in a hospital.

Note that an alternative embodiment of the orientable subassembly 154 may be as shown in U.S. Pat. No. 6,343,006 filed Nov. 19, 1999 which is fully incorporated herein by reference.

When mounting monitors 33 from, e.g., different manufacturers, along a rail 136 as described hereinabove (and as shown in FIGS. 6-8), the center points of the displays 138 of the monitors may not be aligned horizontally, and thus may be substantially non-collinear (e.g., their heights from a common horizontal surface, such as a floor or the desktop 26b, may vary by more than ¼ inch from one another). This can be due to variations in the placement of the VESA attachment holes in the back of most flat panel monitors 33 relative to the center point of their monitor displays. In particular, when mounting different types of monitors 33 (e.g., from different manufacturers and/or of different sizes) on a rail 136, the display center points may vary by enough (e.g., greater than about ¼ inch) to cause user irritation and/or eye fatigue. Accordingly, to alleviate this problem, the back plate 200 (FIG. 8) may be embodied as the vertical adjustment plate 300 (FIGS. 16 and 17).

Figure 16:
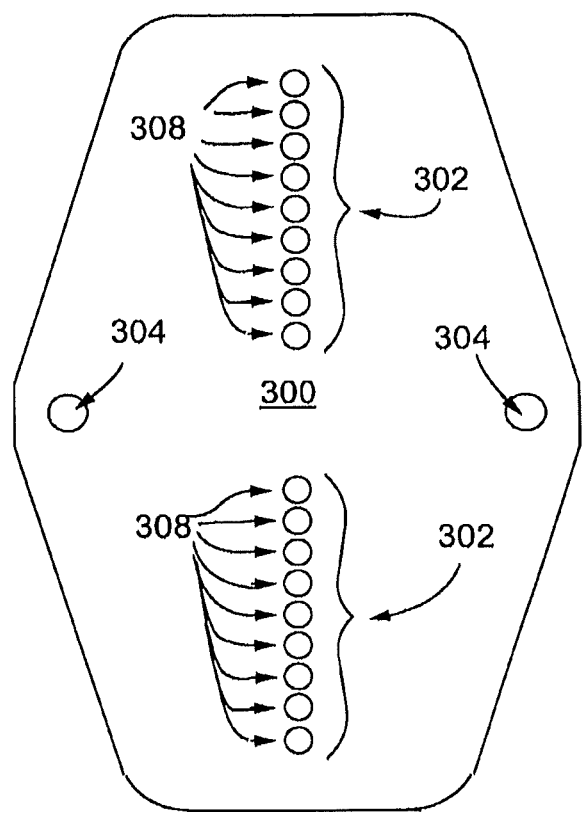
FIGS. 16 and 17 show a vertical adjustment plate which can be attached to a rail 136, and upon which the orientable subassembly 154 may be attached at various heights.
Figure 17:
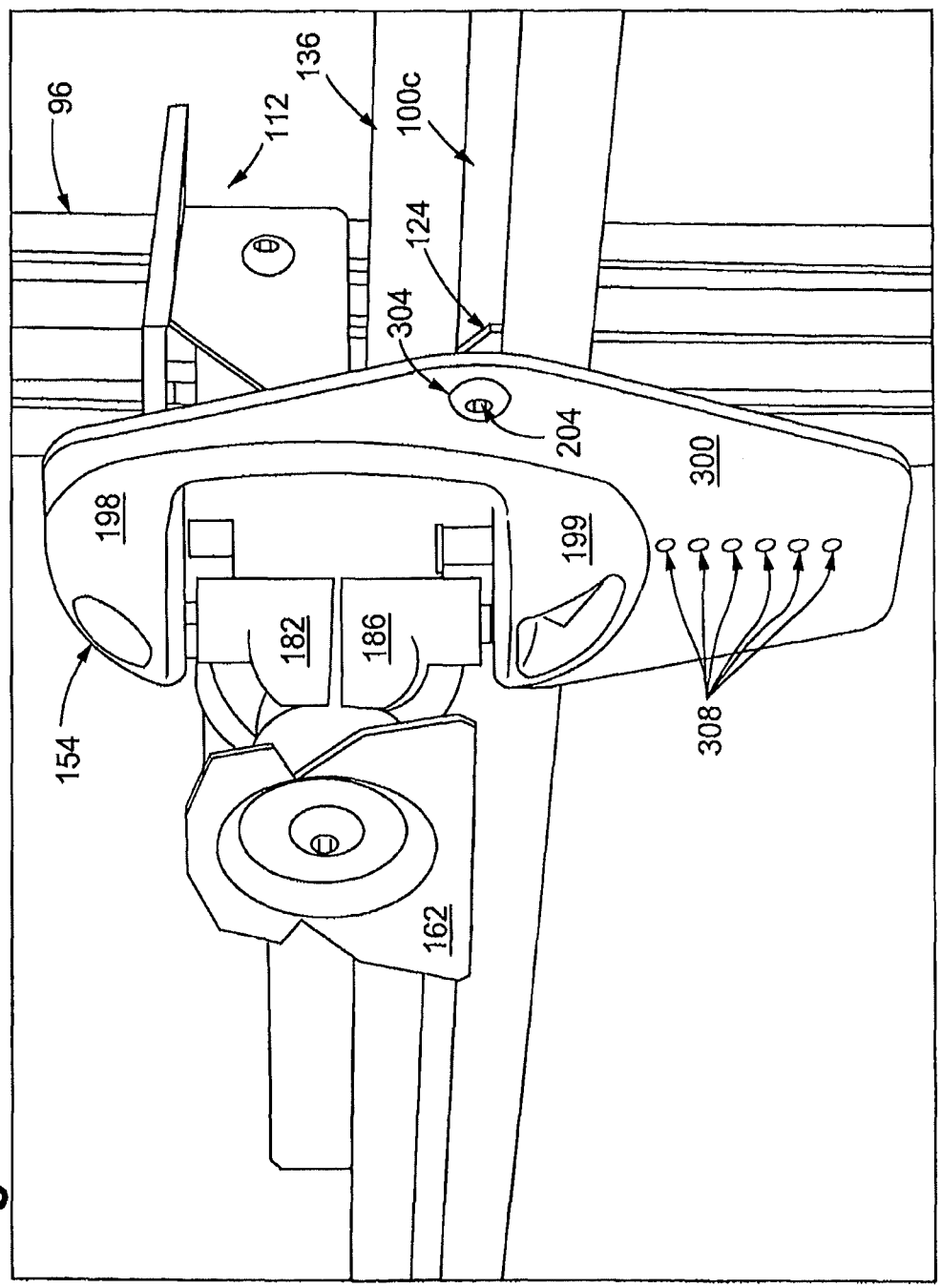

FIG. 16 shows a face-on view of such a vertical adjustment plate 300. The adjustment plate 300 includes bores 304 for mounting this plate on a rail 136 in, e.g., the manner as described hereinabove for mounting the back plate 200 on a rail 136. That is, a bolt 204 and a T-nut 124 may be provided for each bore 304 for attaching the vertical adjustment plate 300 to a rail 136 as shown in FIGS. 7 and 8 (as back plate 200) and also as shown in FIG. 17. In particular, for each bore hole 304, a corresponding T-nut (e.g., the T-nut 124 identified in FIG. 17) is both: (a) threaded onto a bolt (e.g., the bolt 204 identified in FIG. 17) extending through the hole 304, and (b) positioned within the front recess 100 (identified as 100c in FIG. 17) for securing the adjustment plate 300 to the rail 136. Accordingly, once each adjustment plate 300 is mounted on the rail 136, their corresponding orientable subassemblies 154 are attached thereto. For attaching a subassembly 154 to its corresponding adjustment plate 300, two sequences 302 of adjustment holes 308 are provided through the adjustment plate 300, wherein the adjustment holes 308 are aligned vertically on each adjustment plate. Thus, two bolt and nut pairs 202 (as in FIGS. 7 and 8) can be used to secure a orientable subassembly 154 to its adjustment plate 300, wherein the bolt of each pair 202 is provided through an adjustment hole 308 of a different one of the sequences 302. Accordingly, for each monitor 133 wherein a vertical adjustment is desired, e.g., to horizontally align the display center points, a determination is made as to which pair of adjustment holes 308 to select for providing the bolts of the pairs 202 therethrough. For a monitor 33 to be mounted, such a determination may be made by determining a vertical offset (if any) between the center point of the monitor's display 138, and the center of the VESA attachment hole pattern for the monitor, and then comparing this offset with corresponding offsets for the other monitors 33 to be mounted on the same rail 136. Subsequently, the adjustment holes 308 are selected for the monitor that compensates for a deviation from the offsets of the other monitors 33 to be mounted on the same rail 136.

Note that other embodiments of the vertical adjustment plate 300 are also within the scope of the present disclosure. For example, instead of two sequences of discrete adjustment holes 308, a pair of elongated slots may be provided wherein each slot extends substantially over the range of a different one of the sequences 302. Thus, substantially increasingly fine vertical adjustments to monitor heights may be provided.

In some embodiments an additional one or more monitors 33 may be mounted above the primary (e.g., the lowest) row of monitors 33, wherein each such additional monitor may be mounted to one of the vertical posts 96, e.g., without the monitor being also mounted to a rail 136 that attaches to at least two of the posts 96. In one embodiment, a monitor 33 may have the orientable subassembly 154, upon which the monitor is supported, attached directly to one of the vertical posts 96. For example, each of the bolt and nut pairs 202 as shown in FIGS. 7 and 8 may be replaced with a bolt 204 and a T-nut 124 combination for attaching the orientable subassembly 154 to the front recess 100a (e.g., FIG. 6) of a post 96. Alternatively, such an orientable subassembly 154 may be mounted to an intermediary component that is then attached to, e.g., a single post 96, wherein the intermediary component allows a horizontal offset of the orientable subassembly 154 from this post. In one embodiment, such an intermediary component may be a short rail (in one embodiment referred to hereinabove as a horizontal extension 128) that is attached to a single post 96 (or at least, less than all of the posts 96), e.g., as shown in FIGS. 5, 6 and 14 wherein the U shaped attachment 112 may also be used. Accordingly, using such short rails 128 (also denoted rail segments herein), monitors 33 may be arranged in substantially any desired pattern since each monitor may be provided in a custom position. Thus, a monitor 33 having a particular function (e.g., providing a display of a building entry way) may be mounted in a particular position so that its display 138 is easily distinguishable from the displays 138 of the other monitors mounted to the monitor mounting system 20. For example, such a monitor 33 (for the particular functions) might be mounted above all other monitors 33 on a center post 96. Moreover, the use of such rail segments 128 allows for such rail segments to be vertically adjusted on a vertical post 96 to compensate for various flat panel monitor designs with differing mounting hole locations.

Alternatively/additionally, the above-identified intermediary component may be a plate similar to adjustment plate 300, wherein this plate is mounted to a post 94 at a 90 degree orientation to what is shown in FIG. 17. In this embodiment, an alternative embodiment of the orientable subassembly 154 may be used wherein the bolts of the bolt/pairs 202 (FIG. 8) are provided in holes through the rail attachment member 196, wherein the holes are horizontally spaced apart instead of vertically spaced apart as shown in FIG. 17. Additionally, one of ordinary skill in the art will understand that there various other ways of attaching a monitor 33 to a post 96, a rail 136, a rail segment, or a plate. All such ways of attachment are contemplated by the present disclosure. Moreover, it is within the scope of the present disclosure that the orientable subassembly 154 may use other techniques than a ball and socket for orienting a monitor display 138. For example, the moveable assembly 200 of U.S. Patent Application Publication 2005/0088814, filed Oct. 25, 2004, and fully incorporated herein by reference, may be used. Note that due to the omnidirectional adjustability of the orientable subassembly 154, an attached monitor 33 may be positioned so that its display 138 can be in portrait or landscape orientation.

Figure 18:
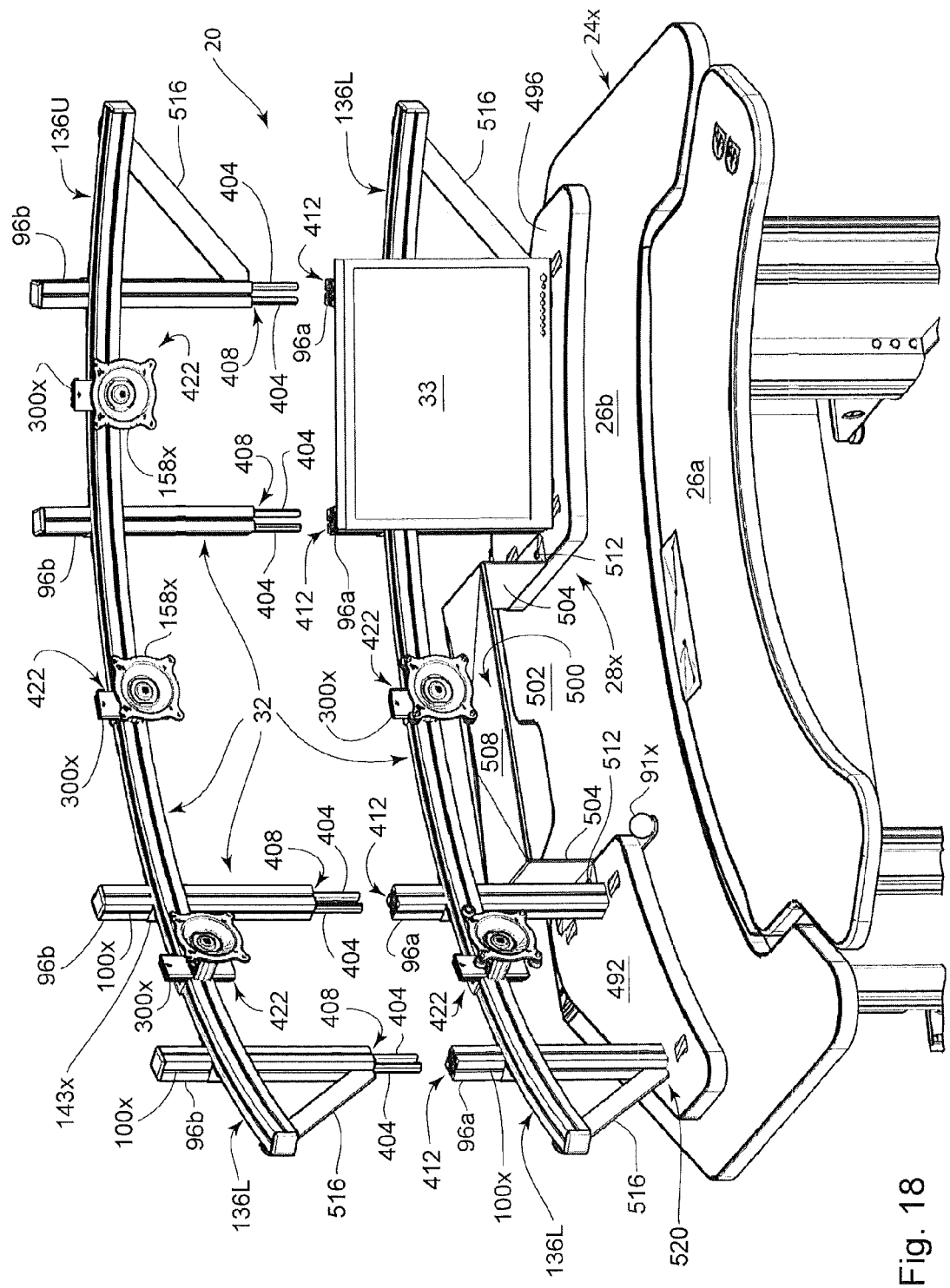
FIG. 18 shows an alternative embodiment of the monitor mounting system 20.
Figure 19:
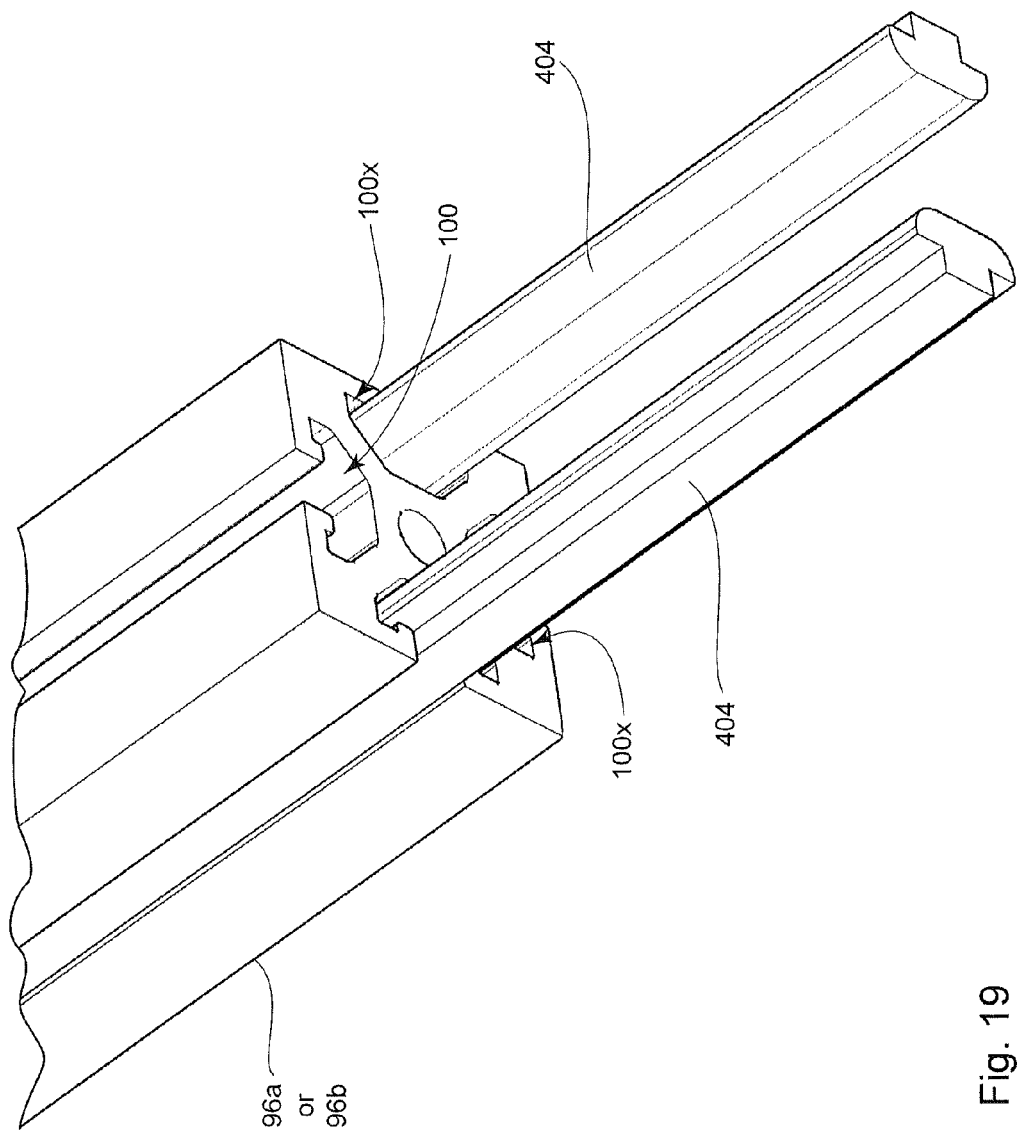
FIG. 19 shows rigid connectors 404 used for connecting a post segment 96a to a post segment 96b.

As discussed above, in some embodiments one or more horizontal rails 136 may be unnecessary by using a plurality of properly spaced vertical posts 96 with orientable subassemblies 154 attached to each post. This embodiment allows small amounts of horizontal adjustment using a mounting plate, such as adjustment plate 300. Moreover, the height of each vertical post 96 may be extended so as to allow two or more monitors 33 to be vertically stacked thereon. In one embodiment, as shown in FIGS. 18 and 19, one or more posts 96 may be extended by providing rigid connectors 404 within at least one (and preferably a plurality) of the post recesses 100. FIG. 19 shows a pair of connectors 404 partially received within recesses on opposite sides of a post segment 96 (96a or 96b in FIG. 18), such recesses being labeled as 100x in FIGS. 18 and 19. In particular, assuming it is desirable to extend each of one or more lower post segments 96a with a corresponding upper post segment 96b, then a pair of connectors 404 may be provided in corresponding aligned recesses 100 of the upper post segment and its corresponding lower post segment. Accordingly, when a pair of connectors 404 is provided in opposing recesses 100 of each of the one or more upper post segments 96b (as shown in FIG. 18) such that each connector is fixed within its recess, e.g., via a set screw, clamp, wedge or other securing mechanism (not shown), then each upper post segment 96b may be positioned so that its pair of connectors 404 slide into recesses 100 in corresponding opposite sides of one of the lower post segments 96a. Accordingly, once each of the lower ends 408 of the upper post segments 96b rests flushly on a corresponding upper end 412 of a lower post segment 96a, the connectors 404 may be fixedly secured in their respective recesses 100 of their lower post segment 96a. Of course, other techniques for securing together upper and lower post segments 96b and 96a may be used. In particular, the connectors 404 may be first provided in the recesses 100 of the lower post segments 96a, wherein the connectors 404 are fixed therein (or in one embodiment, not fixed, but instead, positioned therein so that the lower end of each connector 404 rests on a stop within each recess) so that each connector extends out the upper end 412 of its corresponding lower post segment. Subsequently, the upper post segments 96b are fitted onto the extending portions of the correctors 404. In another embodiment, a corresponding pair of lower and upper post segments may be secured together by providing an intermediary piece that snuggly fits about the perimeter of each the ends 408 and 412 to be coupled together, wherein the intermediary piece includes a stop or separation plate that is internal to the intermediary piece and rests on top of the end 412 and the end 408 rests thereon when the lower and upper post segments are coupled together. Note that the connectors 404 and/or the intermediary piece(s) may be made of steel or aluminum or an alloy thereof.

Referring to FIG. 19, where a more detailed view of a pair of connectors 404 provided in a post segment is shown, note that each connector may have a shape that substantially conforms to the interior of the recess 100 in which the connector is inserted so that there is close tolerance between the interior of the recesses and their inserted connectors. In one embodiment, such a tolerance may be between 0.01 and 0.05 inches, and the connectors may extend into each corresponding recess 100 of a lower and upper post segment at least 3 to 5 inches.

Figure 20:
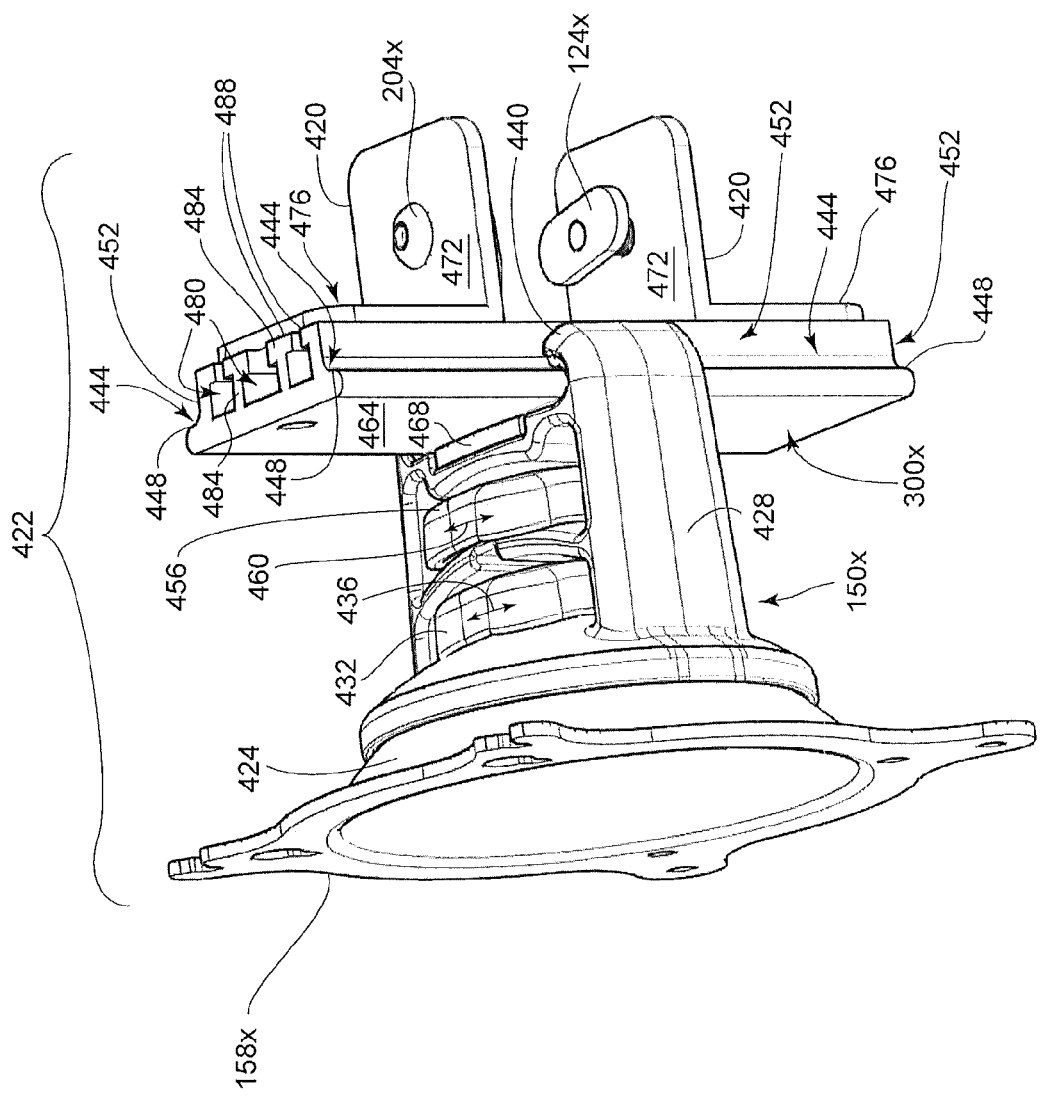
FIG. 20 shows an alternative embodiment of the monitor mounting assembly (150x) in combination with an alternative embodiment of an adjustment plate (300x) for mounting a monitor 33 to post 96, a post segment 96a or 96b, and/or horizontal extension 128.

Referring now to FIGS. 18 and 20, an alternative embodiment of the monitor mounting system 20 provided at a workstation 24x, wherein components for this alternative embodiment are identified with a same numerical label as corresponding components of previously described embodiments of the monitor mounting system 20 hereinabove having a generally similar functionality; however, the label of each such alternative component will also have an "x" appended thereto.

Accordingly, an alternative monitor mounting assembly 150x (FIG. 20) is shown in combination with an alternative embodiment of an adjustment plate 300x is shown in combination with L-shaped brackets 420, wherein the combination of these components (identified as attachment assembly 422) attach a monitor 33 to one or more of: a rail 135, a horizontal extension (e.g., horizontal extension 128, FIG. 5), a post 96 and/or a post segment 96a or 96b. The mounting assembly 150x is manufactured by Chief Manufacturing having a headquarters at 8401 Eagle Creek Parkway, Savage, Minn. 55378 having model number MSPXY100VB. Referring particularly to FIG. 20, the mounting assembly 150x includes a monitor mounting plate 158x for attaching to the backside of the monitor 33 via VESA patterned attachment holes as described hereinabove with reference to the mounting plate 158 and FIGS. 10 and 11. However, the monitor mount plate 158x is integrally attached to a semispherical element 424 which, in turn, partially fits within a housing 428 of the mounting assembly 150x in a manner that allows the semispherical element 424 to be movable within and relative to the housing in a ball and socket fashion. Accordingly, when the mounting plate 158x is attached to a monitor 33 and the attachment assembly 422 is attached to the frame 32 (FIGS. 1, 2, and 18), the monitor 33 can be oriented (e.g., tilted) through a conical angle of 30 degrees (e.g., 60 degrees total rotation), such that a normal to the surface of the monitor display 138 may vary by approximately 30 degrees in all directions. A mechanism for securing the semispherical element 424 in a desired orientation is also included within the housing 428, wherein a wheel or circular tightening member 432 is provided such that rotating the wheel 432 in a first angular direction (of the bidirectional arrow 436) tightens the semispherical element 424 to the housing 428 thereby requiring a progressively greater force to change an orientation of a monitor 33 relative to the housing 428, and rotating the wheel 432 in the opposite angular direction (of the bidirectional arrow 436) loosens the semispherical element 424 from the housing 428 thereby requiring a progressively lesser force to change an orientation of a monitor 33 attached to the housing 428.

The housing 428 includes a pair of grips 440 for griping side channels 444 extending a length of the adjustment plate 300x thereby securing the housing in a desired position along this length. In particular, each side channel 444 has a ledge 448 extending outwardly from a corresponding side wall 452 such that a corresponding one of the grips 440 can slide within the channel (along the length of the adjustment plate 300x) when the housing 428 is loosely coupled to the adjustment plate 300x. Conversely, when the grips 440 are tightened to their corresponding channels 444, the housing 428 is secured in position along the length of the adjustment plate 300x. A second wheel or circular tightening member 456 is provided by the housing 428 for securing and unsecuring the housing in position along the length of the adjustment plate 300x. In particular, the second wheel 456 rotates in a first angular direction (of the bidirectional arrow 460) for tightening the grips 440 to their respective channel 444 thereby requiring a progressively greater force to slide the housing 428 along the length of the adjustment plate 300x (e.g., along face 464), and rotating the wheel 456 in the opposite angular direction (of the bidirectional arrow 460) loosens the housing 428 from the adjustment plate 300x thereby requiring a progressively lesser force to slide or move the housing along the length of the adjustment plate. Note that in one embodiment, rotation of the second wheel 456 moves an attachment plate 468 relative to the face 464 such that when the second wheel is rotated in its first angular direction, the attachment plate 468 moves toward the face 464 relative to the rest of the housing, and thus causes the grips 440 to seat progressively tighter within their side channels 444. Conversely, when the second wheel is rotated in its opposite angular direction, the attachment plate 468 moves away from the face 464 relative to the rest of the housing, and thus causes the grips 440 to progressively loosen from their side channels 444.

Regarding the L-shaped brackets 420, each of these brackets includes projections 472 and 476 at right angles to one another. For each of the projections 472 and 476, there is a corresponding bolt 204x extending therethrough and a corresponding T-nut 124x threaded onto the bolt, such as is shown in FIGS. 7, 8, 14 and 17 for bolt 204 and T-nut 124. In FIG. 20, the bolt head of a bolt 204x, T-nut 124x combination is shown coupled to the upper one of the projections 472, and a T-nut 124x of another bolt 204x, T-nut 124x combination is shown coupled to the lower one of the projections 472. However, for each of the projections 476 there is a corresponding bolt 204x, T-nut 124x combination (not shown) coupled to the projection 476. In one embodiment, the two L-shaped brackets 420 are identical and the projections 472 and 474 are identical in the sense that by reorienting each L-shaped bracket relative to the adjustment plate 300x, the projections 472 become the projections 476 and vice versa.

Regarding the adjustment plate 300x, this plate also includes one or more recesses 480 that extend the length of the adjustment plate on its back side (opposite from the face 464). The recesses 480 reduce the material used in manufacturing the adjustment plates 300x which may be made of steel or aluminum or an alloy thereof. Additionally, such recesses may be used in attaching the L-shaped brackets 420 to the adjustment plate 300x. In particular, since the recesses 480 are defined by recess walls 484, and since each of the recess walls include at least one over hanging ledge 488, such ledges restrict the openings to the interior of the recesses 480. Thus, for each of the L-shaped brackets 420, the bracket is attached to the adjustment plate 300x via the bolt 204x, T-nut 124x combination that is coupled to the bracket's projection 476 such that this bolt, T-nut combination attaches the bracket in substantially a same manner as described hereinabove and also shown in FIGS. 7, 8, 14 and 17 for bolt 204 and T-nut 124. Moreover, note that the pair of bolt 204x, T-nut 124x combinations coupled to the projections 472 are used to attach the attachment assembly 422 to one or more of: a rail 135, a horizontal extension (e.g., horizontal extension 128, FIG. 5), a post 96 and/or a post segment 96a or 96b in substantially a same manner as shown in FIGS. 7, 8, 14 and 17 for bolt 204 and T-nut 124. However, note that the T-nuts 124x are secured, e.g., within the top and bottom recesses 100 of a rail 136 (instead of the rail's front recess 100 as shown in FIGS. 6-8), and within the opposing side recesses 100x (FIG. 18).

Referring again to FIG. 18, an alternative embodiment of the platform 28 is also shown (identified as 28x), wherein this platform includes subplatforms 492 and 496 which may be connected to one another via an extended height bracket 500, wherein this bracket provides an interior storage space 502 underneath it (on the desktop 26b) for, e.g., equipment, informational materials, etc. that could not be stored (on the desktop 26b) under the reduced height offset of the platform 28 or the subplatforms 492, 496. The bracket 500 includes: (i) side walls 504 rising above the upper surfaces of the subplatforms 492 and 496 substantially at their edges, and (ii) a bracket top 508 extending between and attaching to each of the side walls 504. The side walls 504 attach to a corresponding one of the subplatforms 492 and 496 via one or more flanges 512 attached to the subplatform. In FIG. 18, a single flange 512 is attached to the upper side of each subplatform 492 and 496. However, such flanges 512 may be also: (i) attached to the lower side of one or more of the subplatforms 492 and 496, (ii) embedded with the vertical edge of one or more of the subplatforms, or (iii) a pair of flanges 512 may be provided for sandwiching a portion of a subplatform therebetween such that a first flange of the pair attaches to the upper side of the subplatform and a second flange of the pair attaches to a lower side of the subplatform. The flanges 512 may be attached to their respective subplatforms 492 and 496 by screws, bolts, locking fasteners, clamps, etc. In one embodiment, the bracket 500 is attachable and deattachable from the subplatforms 492 and 496 so that, e.g., the subplatforms and the bracket can be shipped disassembled and assembled on-site. A reinforcement for reinforcing the bracket 500 may include: (i) a substantially horizontal bar attached at its ends to the side walls 504 (not shown), (ii) triangular reinforcements for the corners formed by each of the side walls and the bracket top 508 (not shown), and/or (iii) other reinforcing members, e.g., built-in to the side walls or the bracket top. When the bracket 500 is attached to the subplatforms, the subplatforms 492 and 496 are movable as a single unit over the desktop 26b in a similar manner as the platform 28 described hereinabove with reference to FIGS. 1-4. In particular, the rollers 34 and/or alignment guides 80 described hereinabove may be similarly provided for supporting the subplatforms 492 and 496 above the desktop 26a and moveable thereon. Accordingly, the subplatforms 492 and 496 may be offset above the desktop 26b by approximately the same range as the platform 28 of FIGS. 1-4 (e.g., 0.5 to 1.5 inches).

In one embodiment, the side walls 504 of the bracket 500 have a vertical extent of approximately 5 to 12 inches, and more preferably 7 to 9 inches. Thus, storage height of the space 502 between: (i) the bracket top 508, and (ii) the desktop 26b may be approximately 6.5 to 14 inches, and more preferably 8.5 to 12 inches. Additionally, the bracket 500 may have a horizontal extent of between approximately 12 inches and 24 inches. Accordingly, the storage space is at least acceptable for storing, e.g., a 5 inch high stack of manuals, equipment such as audio speakers or a webcam, and/or user personal effects without interfering with the movement of the platform 28x.

Figure 21:
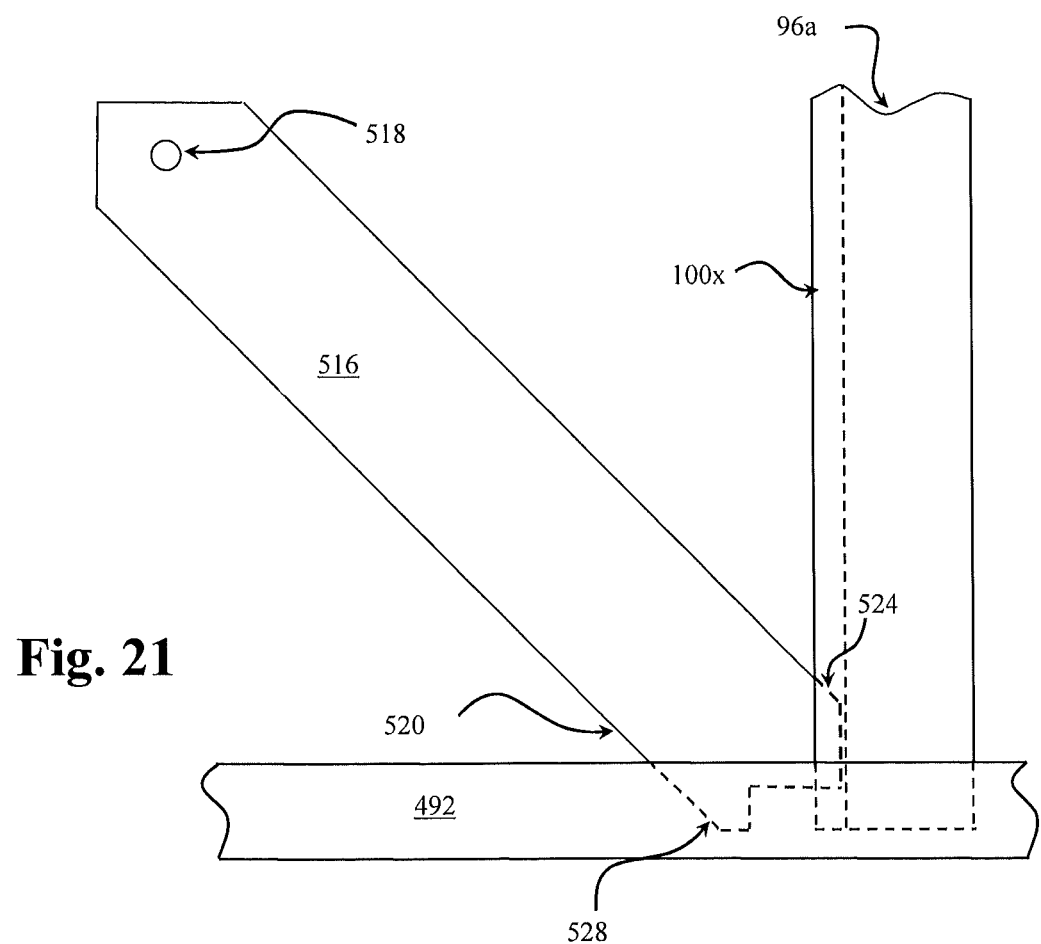
FIG. 21 shows an embodiment of bracket reinforcement 515.

As shown in FIG. 18, the subplatforms 492 and 496 may be of different sizes and shapes depending, e.g., on the shape and size of the desktop 26b, the functional utilization of the top surfaces of the subplatforms. In the present figure, a monitor 33 is provided on the subplatform 496, and the subplatforms 492 and 496 are used as an attachment/support for rail reinforcements 516 to provide additional support to, e.g., the free ends of the lower most rail 136 (identified as 136L in FIG. 18). In particular, the lower end 520 of each such reinforcement 516 may be secured to/within the subplatform on which it is supported via, e.g., the reinforcement being received with a metal slot (not shown) provided in the upper surface of the subplatform, and/or having a flange (also not shown) that is secured to the upper surface of the subplatform. An embodiment of the rail reinforcement 516 is shown in FIG. 21, wherein at the upper end of the reinforcement there is a bolt hole 518 through which the bolt of a bolt 204, T-nut 124 combination may pass through prior to tightening the T-nut on the bolt so that the T-nut is tightly secured within the rail's backside recess 100. Moreover, the lower end 520 of a reinforcement 516 may also include a portion 524 (FIG. 21) that fits within a corresponding recess 100x of a lower post segment 96a, and key 528 that fits within the subplatform (or a metal insert therein).

An embodiment of the reinforcement 516 may also be used (as also shown in FIG. 18) to provide additional support to a free end of an upper rail 136 (identified as 136U in FIG. 18). For supporting a free end of the rail 136U, the reinforcement 516 attaches (via a bolt 204, T-nut 124 combination) in the same manner to the rail 136U as it would to a rail 136L. However, the key 528 may be provided as a downward extension of the portion 524 such that this key fits or locks within an intermediary piece (such as described hereinabove) residing between vertically connected upper and lower post segments 96b and 96a. Note, however, in at least some embodiments such keys 528 may be unnecessary and not used.

FIG. 18 also shows a hand grip 91x for adjusting the distance between a workstation user and the monitors 33 that can be attached to the attachment assemblies 422. The hand grip 91x may be moveable relative to the subplatform 492 to which it is attached so that in a first position (e.g., the position shown in FIG. 18) the platform 28x is moveable along the desktop 26b, and in a second position (e.g., rotated counterclockwise), locks the platform 28x in its location. Such locking may be performed by, e.g., preventing one or more of rollers 34 from rolling, or causing a pad located between the subplatform 492 and the desktop 26b to firmly contact the desktop 26b and thereby prevent movement of the platform 28x, or a lever or stop (not shown) that interferes with the sliding of one of the railings 88.

Figure 22:
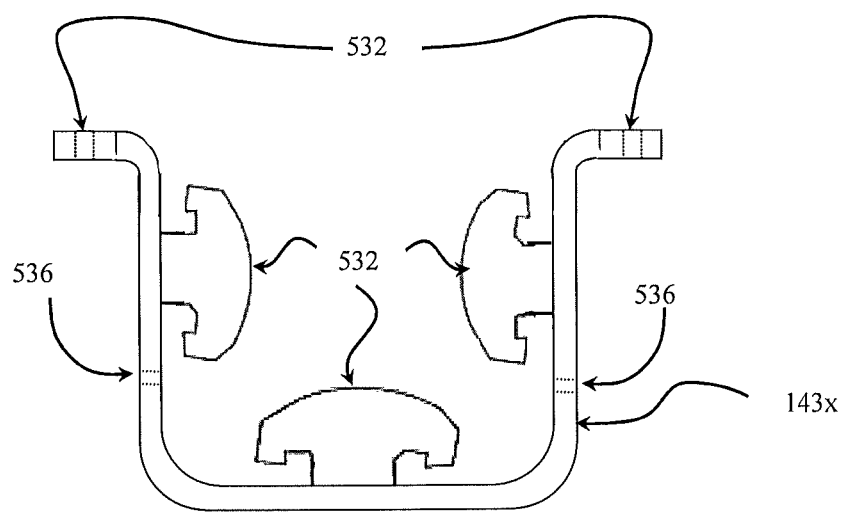
FIG. 22 shows an embodiment of post fastner 143x for attaching, e.g., a rail 136 to a post 96 or a post segment 96a or 96b.

FIG. 18 also includes partial displays of an alternative post fastner 143x, wherein each such fastner 143x is generally "U" shaped for wrapping around its post segment 96a or 96b such that the opening of the "U" opens toward the front of the workstation 24x. FIG. 22 shows a more detailed view of one embodiment of the post fastner 143x, wherein there are three recess inserts 532 for providing in recesses 100 of the post segment 96a or 96b, and bolt holes 536 for receiving a bolt of a bolt 204, T-nut 124 combination, wherein the T-nut is provided within a horizontal recess 100 of a rail 136 being attached to the post segment. Accordingly, once the post fastner 143x is slid onto its post segment (such that the inserts 532 are received in corresponding post recesses 100), then one or more set screws may be provided in threaded holes 540 for fixing the post fastner 143x in place on the post segment. Note that in one embodiment the inserts 532 are unnecessary, and accordingly not provided. Additionally, note that in order to position the post fastners 143x (or any other component/assembly for attaching a rail 136 to a post or post segment), indicia may be provided on a side of each post or post segment so that for different posts or post segments, their fasteners for attaching a same rail 136 can be aligned with the same inidica marking on each such of the posts or post segments so that when the monitor mounting system 20 is fully assembled, the rail is horizontal.

The foregoing discussion of the invention has been presented for purposes of illustration and description. Further, the description is not intended to limit the invention to the form disclosed herein. Consequently, variation and modification commiserate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention. The present disclosure further contemplates methods for assembling, distributing and/or manufacturing the monitor mounting system 20. Additionally, note that the use of the monitor mounting system 20 includes the steps of: (a) a user facing the workstation 24, (b) the user positioning him/herself so that his/her substantially in space 72; (c) the user determining (if necessary) one or more of: (i) a vertical height adjustment of a rail 136, (ii) an orientation of one or more displays 138, and (iii) a distance of the monitor mounting system 20 from the user so that, e.g., the above-identified ergonomic settings are appropriate to the user's physical characteristics; (d) adjusting (if necessary) one or more of (c)(i) through (c)(iii) above so that the above-identified preferred ergonomic monitor viewing settings are provided for the user; and (e) the user viewing the displays 138 from the space 72.

The invention claimed is:

1. A computer monitor mounting apparatus for mounting a plurality of monitors, comprising:
   a plurality of monitors;
   a platform having at least one guide attached thereto, wherein the guide also contacts an upwardly facing surface so that the guide maintains the platform on a predetermined path along the upwardly facing surface when the platform moves on the upwardly facing surface, the platform including a plurality of spaced apart subplatforms;
   a frame extending above the platform and attached thereto for moving with the platform when the platform moves along the predetermined path, the frame providing mountings supporting the plurality of the monitors above the platform;
   wherein the guide includes portions that move relative to one another within a space between the upwardly facing surface and the subplatforms;
   one or more wheels or rollers for rolling the platform on the upwardly facing surface, wherein the wheels or rollers move over the upwardly facing surface for at least a portion of a travel extent for the wheels or rollers, each wheel or roller having an extent that rotatably contacts the upwardly facing surface when the platform moves along the predetermined path;
   a connector for connecting the subplatforms together, wherein the connector provides an interior that is: (i)

between at least two of the subplatforms, and (ii) between an upper boundary of the interior and the upwardly facing surface; and wherein the interior provides storage space on the upwardly facing surface, the interior having a height above the upwardly facing surface of at least three times a height of the space between the upwardly facing surface and the subplatforms, wherein the interior is effective for storing one or more items without interfering with movement of the platform on the predetermined path.

2. The apparatus of claim 1, wherein the at least one guide includes a portion that is fixedly attached to the upwardly facing surface.

3. The apparatus of claim 1, wherein the at least one guide telescopes during movement of the monitor mounting apparatus over the upwardly facing surface.

4. The apparatus of claim 1, wherein the at least one guide retracts and extends during movement of the monitor mounting apparatus over the upwardly facing surface.

5. The apparatus of claim 1, wherein the platform has a range of movement along the predetermined path of at least 13 inches.

6. The apparatus of claim 1, wherein the platform has a range of movement along the predetermined path of less than 20 inches.

7. The apparatus of claim 1, wherein at least one of the mountings includes a predetermined monitor mount hole pattern.

8. The apparatus of claim 1, wherein for each monitor of at least some of the monitors, a corresponding one of the mountings attaches the monitor to a horizontal rail of the frame, wherein the corresponding mounting provides a horizontal range of rotation of at least 60 degrees for the monitor.

9. The apparatus of claim 1, wherein the monitors are provided along an arc of the frame such that for a corresponding display for each of at least two-thirds of the monitors, and for at least one position facing the displays, a distance between:

(i) the at least one position, and (ii) a center of the corresponding display, varies by no more than about 5% from a distance between the at least one position and a center of the corresponding display for each of the other monitors of the at least two-thirds of the monitors.

10. The apparatus of claim 1, wherein the frame includes at least one substantially horizontal rail wherein at least one of the mountings is horizontally slidable along the rail.

11. The apparatus of claim 1, wherein the frame includes a substantially horizontal rail for supporting at least one of the mountings thereon, and further including an adjustment plate for providing a vertical adjustment of the mounting on the rail, the plate secured between the rail and the at least one mounting, the plate secured separately to each of the rail and the at least one mounting.

12. The apparatus of claim 1, wherein at least one of the mountings includes a first rotational member, wherein when a corresponding one of the monitors is attached to the at least one mounting, the first rotational member provides a first rotation range for the corresponding monitor.

13. The apparatus of claim 1, wherein the upwardly facing surface includes a substantially horizontal desktop.

* * * * *